United States Patent
Swamy et al.

(10) Patent No.: US 8,978,106 B2
(45) Date of Patent: Mar. 10, 2015

(54) PROGRAMMING, VERIFYING, VISUALIZING, AND DEPLOYING BROWSER EXTENSIONS WITH FINE-GRAINED SECURITY POLICIES

(75) Inventors: Nikhil Swamy, Seattle, WA (US); Benjamin Livshits, Kirkland, WA (US); Arjun Guha, Providence, RI (US); Matthew J. Fredrikson, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 463 days.

(21) Appl. No.: 13/052,121

(22) Filed: Mar. 21, 2011

(65) Prior Publication Data

US 2012/0246701 A1 Sep. 27, 2012

(51) Int. Cl.
| | |
|---|---|
| G06F 21/00 | (2013.01) |
| H04L 29/06 | (2006.01) |
| G06F 17/00 | (2006.01) |
| G06F 7/04 | (2006.01) |

(Continued)

(52) U.S. Cl.
CPC ...................... G06F 17/00 (2013.01)
USPC ............ 726/4; 726/1; 726/2; 726/22; 726/25; 705/27.1; 717/154

(58) Field of Classification Search
USPC .......... 726/4, 1, 2, 22, 25; 705/27.1; 714/154; 717/154
See application file for complete search history.

(56) References Cited

U.S. PATENT DOCUMENTS

| | | | |
|---|---|---|---|
| 2008/0104665 A1* | 5/2008 | Naldurg et al. | 726/2 |
| 2009/0144828 A1* | 6/2009 | Thomlinson | 726/25 |

(Continued)

FOREIGN PATENT DOCUMENTS

| | | | |
|---|---|---|---|
| EP | 2587758 A2 * | 5/2013 | |
| WO | WO 2010017828 A1 * | 2/2010 | |

OTHER PUBLICATIONS

Barua, A.; Zulkernine, M.; Weldemariam, K.; "Protecting Web Browser Extensions from JavaScript Injection Attacks"; Engineering of Complex Computer Systems (ICECCS), 2013 18th International Conference on DOI: 10.1109/ICECCS.2013.36; Publication Year: Jul. 2013, pp. 188-197.*

(Continued)

*Primary Examiner* — Andrew Nalven
*Assistant Examiner* — Courtney Fields
(74) *Attorney, Agent, or Firm* — Julie Kane Akhter; Danielle Johnston-Holmes; Micky Minhas

(57) ABSTRACT

An environment is described which enables the generation, analysis, and use of secure browser extensions. Each browser extension includes an extension body and a policy expressed in a logic-based specification language. The policy specifies the access control and dataflow privileges associated with the extension body in a fine-grained manner by leveraging the structure and content of resources that are accessible to the browser extension. A suite of analysis tools for testing the safety of the browser extension includes a visualization module identifies features of a resource that are accessible to the policy. A static analysis module uses a static analysis technique to determine whether the extension body satisfies the policy. The environment also includes a conversion module for converting the browser extension, once deemed safe, into a form for use by a particular type of browser. The browser can execute that extension without performing runtime safety checks.

20 Claims, 15 Drawing Sheets

(51) Int. Cl.
  *G06F 11/00* (2006.01)
  *G06F 9/45* (2006.01)
  *G06Q 30/00* (2012.01)

(56) References Cited

U.S. PATENT DOCUMENTS

| | | | | |
|---|---|---|---|---|
| 2010/0077444 | A1* | 3/2010 | Forristal | 726/1 |
| 2011/0029961 | A1* | 2/2011 | Muth et al. | 717/154 |
| 2012/0072312 | A1* | 3/2012 | Lange et al. | 705/27.1 |

OTHER PUBLICATIONS

Louw, et al., "Extensible Web Browser Security," retrieved at <<http://citeseerx.ist.psu.edu/viewdoc/download?doi=10.1.1.86.8972&rep=rep1&type=pdf >>, Proceedings of the 4th International Conference on Detection of Intrusions and Malware, and Vulnerability Assessment, 2007, 20 pages.

Larholm, Thor, "0day Vulnerability in Firebug," retrieved at <<http://larholm.com/2007/04/06/0day-vulnerability-in-firebug/>>, larholm.com, Apr. 6, 2007, 4 pages.

Kassner, Michael, "Chrome extensions: Potential cracks in the armor?," retrieved at <<http://blogs.techrepublic.com.com/security/?p=3523>>, techrepublic.com, Apr. 27, 2010, 6 pages.

Lerner, et al., "Language Support for Extensible Web Browsers," retrieved at <<http://www.cs.washington.edu/homes/djg/papers/aplwaca2010.pdf>>, Proceedings of the 2010 Workshop on Analysis and Programming Languages for Web Applications and Cloud Applications, Jun. 2010, 5 pages.

Seltzer, Larry, "Google's Chrome Extensions Show Security Focus," retrieved at <<http://www.cs.washington.edu/homes/djg/papers/aplwaca2010.pdf>>, PCMag.com, Feb. 16, 2010, 4 pages.

Reis, et al., "BrowserShield: Vulnerability-Driven Filtering of Dynamic HTML," retrieved at <<http://research.microsoft.com/en-us/um/people/helenw/papers/bshield-osdi2006.pdf>>, Proceedings of the 7th Symposium on Operating Systems Design and Implementation, 2006, 14 pages.

Bandhakavi, et al., "VEX: Vetting Browser Extensions for Security Vulnerabilities," retrieved at <<http://www.usenix.org/events/sec10/tech/full_papers/Bandhakavi.pdf >>, Proceedings of the 19th USENIX Conference on Security, 2010, 16 pages.

Barth, et al., "Protecting Browsers from Extension Vulnerabilities," retrieved at <<http://www.adambarth.com/papers/2010/barth-felt-saxena-boodman.pdf>>, Proceedings of the 17th Network and Distributed System Security Symposium, Dec. 2009, 12 pages.

Beaucamps, et al., "Malicious Firefox Extensions," retrieved at <<indefinitestudies.files.wordpress.com/2008/08/beaucamps-reynaud-maliciousextensions-en.pdf>>, Jun. 2008, 14 pages.

Dhawan, et al., "Analyzing Information Flow in JavaScript-Based Browser Extensions,", retrieved at <<http://www.cs.rutgers.edu/~vinodg/papers/acsac2009a/tr648.pdf>>, Rutgers University DCS Technical Report 648, Apr. 2009, 15 pages.

Egele, et al., "Dynamic Spyware Analysis," retrieved at <<http://bitblaze.cs.berkeley.edu/papers/usenix07.pdf>>, Proceedings of the USENIX Annual Technical Conference, 2007, 14 pages.

Kirda, et al., "Behavior-Based Spyware Detection," retrieved at <<http://www.iseclab.org/papers/spyware.pdf>>, Proceedings of the 15th Conference on USENIX Security Symposium, vol. 15, 2006, 16 pages.

Li, et al., "Spy Shield: Preserving Privacy from Spy Add-ons," retrieved at <<http://www.informatics.indiana.edu/xw7/ papers/spyshield.pdf>>, Proceedings of the 10th International Conference on Recent advances in Intrusion Detection, Sep. 2007, 20 pages.

Louw, et al., "Enhancing Web Browser Security against Malware Extensions," retrieved at <<http://www.mike.tl/publications/virology08-4-3-tlv.pdf>>, Journal of Computer Virology, 2008, 17 pages.

"New Malicious Firefox Extension: FirestarterFox," retrieved at <<blog.misec.net/2008/09/25/new-malicious-firefox-extension-firestarterfox/>>, Mischel Internet Security, 2008, 3 pages.

Larkin, Erik, "Malicious Firefox Add-ons Installed Trojans," retrieved at <<www.pcworld.com/article/188651/malicious firefox addons installed trojans.html>>, PCWorld, Feb. 6, 2010, 3 pages.

Goodin, Dan, "The Register. Firefox Users Caught in Crossfire of Warring Add-ons", Retrieved at << http://www.theregister.co.uk/2009/05/04/firefox_extension_wars/ >>, The Register, May 4, 2009, 3 pages.

Fredrikson, et al., "RePriv: Re-envisioning In-browser Privacy," retrieved at <<http://research.microsoft.com/apps/pubs/default.aspx?id=137038>>, Technical Report No. MSR-TR-2010-116, Microsoft Corporation, Redmond, WA, Aug. 2010, 37 pages.

Ball, et al., "The SLAM project: Debugging System Software via Static Analysis," retrieved at <<http://acm.org >>, Proceedings of the 29th ACM SIGPLAN-SIGACT Symposium on Principles of Programming Languages, 2002, pp. 1-3.

Chapin, et al., "Authorization in Trust Management: Features and Foundations," retrieved at <<http://acm.org >>, ACM Computing Surveys, vol. 40, Issue 3, Aug. 2008, 48 pages.

Chugh, et al., "Staged Information Flow for Javascript," retrieved at <<http://acm.org >>, Proceedings of the 2009 ACM SIGPLAN Conference on Programming Language Design and Implementation, 2009, pp. 50-62.

De Moura, et al., "Z3: An Efficient SMT Solver," retrieved at <<http://research.microsoft.com/en-us/um/redmond/projects/z3/z3.pdf>>, 14th International Conference on Tools and Algorithms for the Construction and Analysis of Systems, 2008, 3 pages.

Goldberg, et al., "A Secure Environment for Untrusted Helper Applications," retrieved at <<http://www.cs.berkeley.edu/~brewer/papers/janus.pdf>>, Proceedings of the 6th Conference on USENIX Security Symposium, Focusing on Applications of Cryptography, vol. 6, 1996, 13 pages.

Grier, et al., "Secure Web Browsing with the OP Web Browser," retrieved at <<http://www.net.t-labs.tu-berlin.de/teaching/ws0910/IS_seminars/papers/grier08.pdf>>, IEEE Symposium on Security and Privacy, 2008, 15 pages.

Guha, et al., "The Essence of JavaScript," retrieved at <<http://www.cs.brown.edu/~sk/Publications/Papers/Published/gsk-essence-javascript/>>, European Conference on Object-Oriented Programming, 2010, 25 pages.

Zhou, et al., "Safedrive: Safe and Recoverable Extensions Using Language-based Techniques," retrieved at <<http://www.eecs.berkeley.edu/~necula/Papers/deputy-osdi06.pdf>>, Symposium on Operating Systems Design and Implementation, 2006, 16 pages.

Lerner, al., "C3: An Experimental Extensible, Reconfigurable Platform for HTML-based Applications," retrieved at <<http://www.cs.washington.edu/homes/blerner/papers/webapps2011.html>>, retrieved on Mar. 21, 2011, abstract only, 1 page.

"Add-on Security Vulnerability Announcement," retrieved at <<http://blog.mozilla.com/addons/2010/07/13/add-on-security-announcement/>>, retrieved on Mar. 21, 2001, Mozilla Add-ons Blog, Mozilla Foundation, 5 pages.

Swamy, et al., "Enforcing Stateful Authorization and Information Flow policies in Fine," retrieved at <<http://research.microsoft.com/en-us/um/people/nswamy/papers/fine-esop.pdf>>, Lecture Notes in Computer Science, vol. 6012, Springer-Verlag Berlin Heidelberg, 2010, 20 pages.

Swamy, et al., "Security Programming with Refinement Types and Mobile Proofs," retrieved at <<http://research.microsoft.com/apps/pubs/?id=141708>>, Technical Report No. MSR-TR-2010-149, Microsoft Corporation, Redmond, WA, Jan. 2011, 42 pages.

Wang, et al., "The Multi-principal OS Construction of the Gazelle Web Browser," retrieved at <<http://research.microsoft.com/apps/pubs/default.aspx?id=79655 Proceedings of the 18th Conference on USENIX Security Symposium, 2009, 20 pages.

Yee, et al., "Native client: A Sandbox for Portable, Untrusted x86 Native Code," retrieved at <<http://research.google.com/pubs/pub34913.html>>, IEEE Symposium on Security and Privacy, 2009, 15 pages.

Zheng, al., "Dynamic Security Labels and Noninterference," retrieved at <<http://www.cs.cornell.edu/andru/papers/dynlabel.pdf>>, Formal Aspects of Security and Trust, Spring, 2005, 13 pages.

Swamy, et al., "Verified Security for Browser Extensions," retrieved at <<http://research.microsoft.com/apps/pubs/default.

(56) References Cited

OTHER PUBLICATIONS aspx?id=141971>>, Microsoft Report No. MSR-TR-2010-157, Microsoft Corporation, Redmond, WA, Nov. 2010, 17 pages.

Combs, Robert, Deductive Databases and Their Applications, retrieved at <<http://www.amazon.com/DeductiveDatabases-Applications-Robert-Colomb/dp/0748407979>>, Amazon.com product page only, CRC Press, 1998, 4 pages.

"Datalog," retrieved at <<http://en.wikipedia.org/wiki/Datalog>>, Wikipedia.com entry, retrieved on Jan. 23, 2011, 4 pages.

Bengston, et al., "Refinement Types for Secure Implementations," retrieved at <<http://research.microsoft.com/enus/projects/f7/seven-csf08-paper.pdf>>, ACM Transactions on Programming Languages and Systems, vol. 33, No. 2, Article 8, 2011, 45 pages.

Bhargavan, et al., "Pre- and Post-conditions for Security Typechecking," retrieved at <<http://research.microsoft.com/en-us/um/people/fournet/papers/pre-and-post-conditions-for-security-typechecking-fcs10.pdf>>, Workshop on Foundations of Security and Privacy, 2010, 18 pages.

Ca Technologies, "Virus Details: Win32/clspring Family", Retrieved From: <<http://www.ca.com/us/securityadvisor/virusinfo/virus.aspx?ID=42280>>, Retrieved: Aug. 30, 2007, Mar. 23, 2006.

Chen et al., "Type-Preserving Compilation for End-to-End Verification of Security Enforcement", Proceedings of the ACM SIGPLAN Conference on Programming Language Design and Implementation, pp. 412-423, 2010.

Felt et al., "The Effectiveness of Install-Time Permission Systems for Third-Party Applications", Technical Report UCB/EECS-2010-143, University of California at Berkeley, Dec. 3, 2010.

Google Chrome, "Popular Google Chrome Extensions", Retrieved at: <<http://chrome.google.com/extensions/list/popular>>, Retrieved Mar. 9, 2011, 2010.

Gordon et al., "Authenticity By Typing for Security Protocols", Journal of Computer Security, vol. 11, Jul. 2003.

Grumberg et al., "Model Checking and Modular Verification", ACM Transactions on Programming Languages and Systems, vol. 16 Issue 3, May 1994, pp. 843-871.

Guarnieri et al., "GateKeeper: Mostly Static Enforcement of Security and Reliability Policies for JavaScript Code", Proceedings of the 18th Conference on USENIX Security Symposium, pp. 151-168, 2009.

Guarnieri et al., "Gulfstream: Staged Static Analysis for Streaming JavaScript Applications", Proceedings of the 2010 USENIX Conference on Web Application Development, p. 6, 2010.

Meyerovich et al., "ConScript: Specifying and Enforcing Fine-Grained Security Policies for JavaScript in the Browser", Proceedings of the IEEE Symposium on Security and Privacy, pp. 481-496, 2010.

Mozilla Foundation, "How Many Firefox Users use Add-Ons?" Retrieved at: <<http://blog.mozilla.com/addons/2009/08/11/how-many-firefox-users-use-add-ons/>>, 2009.

Swamy et al., "A Theory of Typed Coercions and It's Applications", Proceedings of the 14th ACM SIGPLAN International Conference on Functional Programming, pp. 329-340, 2009.

Thomas, Keir, "Chrome Browser Acts More Like an OS, but Security is Unclear", Retrieved at: <<http://www.pcworld.com/businesscenter/article/220756/chrome_browser_acts_more_like_an_os_but_security_is_unclear.html>>, 2011.

Swamy et al., "Verified Security for Browser Extensions", Proceedings of the IEEE Symposium on Security and Privacy, pp. 115-130, May 22-25, 2011.

* cited by examiner

← 700

∀ e, p. (EltParent e p && EltTagName p "div" && EltAttr p "class" "website")
→ CanRead e

FIG. 7

Metadata Predicates
DocDomain doc string — the document, doc has domain string
EltDoc elt doc — the element elt is in the doc
EltParent elt p — p is the parent-element of elt
EltTagName elt tagName — elt's tag-name is tagName
EltTextValue elt v — elt's text-value is v
EltAttr elt k v — elt has an attribute k, with value v
EltStyle elt sty — elt's style is sty
UrlScheme url s — url's scheme is s (e.g., "http:", "ftp:", etc.)
UrlHost url h — url's host is h
UrlQuery url p — url's query parameters are p
FlowsFrom a b — a was derived from b

Permission Predicates
CanReadSelection doc — the extension can determine user's selection on doc
CanAppend elt — the extension can append elements to elt
CanEdit elt — the extension can modify elt
CanReadValue elt — the extension can read the text value of elt
CanWriteValue elt — the extension can write text to elt
CanWriteAttr elt k v — the extension can write v to the k-attribute of elt
CanReadAttr elt k — the extension can read the attribute named k on elt
CanStyle sty — the extension can modify the style sty
CanRequest str — the extension can send HTTP requests to url str
CanFlowTo a b — the extension is allowed to write a to b
CanReadHistory site — the extension is allowed to read history on site
CanReadFile file — the extension is allowed to read the local file

FIG. 8

EXAMPLE OF A REFINED API

```
1   module DOM
2   type doc (*abstract type of documents*)
3   type elt  (*abstract type of DOM element nodes*)

4   (*DOM metadata predicates*)
5   type DocDomain :: doc → string → prop
6   type EltDoc :: elt → doc → prop
7   type EltTagName :: elt → string → prop
8   type EltAttr :: elt → string → string → prop
9   type FlowsFrom :: α :: ★ → β :: ★ → α → β → prop 10  (*DOM permission predicates*)
11  type CanAppend :: elt → elt → prop
12  type CanEdit :: elt → prop
13  type CanReadAttr :: elt → string → prop
14  type CanWriteAttr :: elt → string → string → prop
15  type CanFlowTo :: α :: ★ → β :: ★ → α → β → prop 16  (*Metadata queries*)
17  val getChild : p:elt → int →
18     r:elt option{∀ch. r=Some ch → EltParent p ch && FlowsFrom r p}
19  val parentNode: ch:elt → p:elt{EltParent p ch}
20  val getEltById: d:doc → x:string → c:elt{EltDoc c d && EltAttr c "id" x}
21  val tagName : ce:elt → r:string{EltTagName ce r}

22  (*Protected access to data*)
23  val getAttr : e:elt → k:string{CanReadAttr e k} →
24     r:string{EltAttr e k r && FlowsFrom r e}
25  val setAttr : e:elt → k:string → v:string{CanWriteAttr e k v} →
26     _:unit{EltAttr e k v}
27  val getValue : e:elt{CanReadValue e} → s:string{EltTextValue ce s}
28  val createElt : d:doc → t:string →
29     e:elt{EltDoc e d && EltTagName e t && CanEdit e}
30  val appendChild : p:elt → c:elt{CanAppend c p} → _:unit{EltParent p c}
```

FIG. 11

EXAMPLE OF A LOGIC-BASED POLICY 1   prop EltAncestor :: elt → elt → prop 2   assume ∀e1, e2. EltParent e1 e2 → EltAncestor e1 e2

3   assume ∀e1, e2, e3. EltParent e1 e2 && EltParent e2 e3 → EltAncestor e1 e3

4   assume ∀(e:elt). CanReadAttr e "class"

5   assume ∀(e:elt), (p:elt). (EltAncestor e p && EltTagName p "div" && EltAttr p "class" "website") →CanReadValue e

FIG. 12

EXAMPLE OF AN EXTENSION BODY

```
7      let extensionCode (e:elt) =
8         let t = tagName e "div" in
9         let a = getAttr e "class" in
10        if t = "div" && a = "website"
11        then match getChild e 0 with
12            | Some c → Some (getValue c)
13            | None → None
14        else None
```

FIG. 13

ANOTHER EXAMPLE OF A REFINED API, POLICY, AND EXTENSION BODY 1  (*Partial API to local file system, URLs, network, and history*)
2  type url
3  type CanReadFile :: string → prop
4  type UrlHost :: url → string → prop
5  type CanRequest :: url → string → prop
6  type CanReadHistory :: string → prop
7  val readFile: f:filename{CanReadFile f} → s:string{FlowsFrom s f}
8  val mkUrl: s:string → h:string → ... → u:url{UrlHost u h && ...}
9  val sendRequest: u:url → s:string{CanRequest u s} → resp:string
10 val historyOnSite: host:string{CanReadHistory h} → url list 11 (*Policy*)
12 let prefs = "AppData\NewsPers\prefs.txt"
13 assume CanReadFile prefs
14 assume CanReadHistory "abc.com"
15 assume ∀s, u. FlowsFrom s prefs && UrlHost u "xyz.com" → CanRequest s u
16 assume ∀e1 e2 e3. FlowsFrom e2 e3 && EltDomain e3 "abc.com"
17    EltDomain e1 "abc.com" → CanAppend e1 e2
18 assume ∀e e2 e3. EltAncestor e2 e3 && FlowsFrom e e2 → FlowsFrom e e3

19 (*Sending request to xyz.com*)
20 val parseResponse: string → url list
21    let getPopularStories () =
22       let p = readFile prefs in
23       let url = mkUrl "http" "xyz.com" ... in
24       let resp = sendRequest url p in
25       parseResponse resp 26 (*Rearranging abc.com*)
27 val munge: xyz:url list → history:url list → url list
28 val nodesInOrder: o:url list → r:elt → (e:elt{FlowsFrom e r}) list
29 let start root =
30    if (domain root) = "abc.com" then
31       let popular = getPopularStories () in
32       let h = getHistoryOnSite "abc.com" in
33       let ordering = munge popular h in
34       let nodes = nodesInOrder ordering root in
35       iter (fun e → appendChild root e) nodes
36    else ()

FIG. 14

PROGRAMMING, VERIFYING, VISUALIZING, AND DEPLOYING BROWSER EXTENSIONS WITH FINE-GRAINED SECURITY POLICIES

BACKGROUND

A user may decide to download and install a browser extension to provide desired functionality that is not provided by the browser itself. When invoked, the browser extension can perform various tasks, depending on the objective of the browser extension. For instance, a browser extension may access and extract content provided by a web page with which the user is interacting and then perform any type of operations on the extracted content. In addition, or alternatively, the browser extension can modify the content presented by the web page. In addition or alternatively, the browser extension can access the user's browsing history and/or perform other operations which affect local storage. In addition or alternatively, the browser extension can interact with other network-accessible third-party entities. For example, the browser extension can potentially transfer content extracted from a web page to a third-party entity, such as another website. Or a browser extension can obtain information from a third-party source and apply it to a web page that the user is viewing. These operations are cited by way of example, not limitation; browser extensions can perform yet other tasks.

The above-noted functions performed by browser extensions raise security concerns. For example, assume that a user is currently interacting with a bank-related website. A malicious extension can potentially overstep its stated functions and extract personal information regarding the user (such as the user's password), which it can then potentially send to a third party entity. In addition or alternatively, a malicious extension can modify the content of a web page in an undesirable manner, which may provide misinformation to the user and/or prompt the user to perform harmful actions.

In view of the above concerns, browser providers have adopted various approaches to reduce the security risks associated with browser extensions. In a community-review approach, a browser provider may subject a newly created browser extension to community review. If the browser extension passes this review, the browser provider can add the browser extension to a collection of downloadable extensions. A browser can be configured such that it will not install a browser extension that does not originate from the trusted source. The authenticity of a browser extension can be assessed based on a signature-bearing certificate which accompanies the browser extension.

In a runtime privilege-checking approach, a browser provider can provide a manifest which accompanies the browser extension. The manifest specifies the privileges that are granted to the browser extension. When a user attempts to install such a browser extension, the browser can access the manifest and display the privileges associated with the browser extension. For example, the displayed privileges may indicate the nature and scope of the content that will be accessed by the browser extension. The displayed privileges may also indicate whether the browser extension is permitted to access the user's browsing history. If the user deems the privileges acceptable, he or she may agree to install the browser extension. Next assume that, during the runtime execution of the browser extension, the browser extension attempts to perform an operation which is outside the bounds of the privileges specified in the manifest. The browser can refuse to perform the operation and attempt to unload the browser extension, potentially informing the user about the unexpected extension behavior.

The above-described approaches are not fully satisfactory for illustrative reasons set forth herein.

SUMMARY

An environment is described herein that involves the construction, analysis, visualization, and deployment of secure browser extensions. Each browser extension includes the executable code of the browser extension (the extension body) and a policy. The policy expresses fine-grained privileges that are granted to the extension body. More specifically, the policy may be expressed using a collection of meta-data predicates applicable to the structure and content of resources accessible to the browser extension, such as network-accessible pages, together with a collection of permission predicates that grant respective permissions over the resources to the browser extension. Using these predicates, the policy can leverage the structure and content of the resources to pinpoint particular parts of the resources that are accessible to the browser extension.

According to one illustrative aspect, a policy can specify at least access control and data flow privileges. An access control privilege grants the browser extension permission to access information provided in a resource, such as a network-accessible page. A dataflow privilege constrains the interaction between resources, including an ability of the browser extension permission to interact with a third party entity, such as by sharing content provided on a page with the third-party entity, or vice versa.

According to one illustrative aspect, the policy can be generated using a logic-based specification language, such as Datalog. Datalog places constraints on the use of negation, a property that proves useful in the context of static analysis.

Accordingly to another illustrative aspect, the environment includes a suite of analysis tools that enable a curator to test the safety of a browser extension. Upon approval, the curator can add a browser extension to a network-accessible data store. Users can download selected browser extensions from this data store.

According to another illustrative aspect, one analysis tool comprises a visualization module. The visualization module renders an impact of the policy on a resource (such as a network-accessible page) by visually identifying features of the resource that are impacted by the policy.

According to another illustrative aspect, another analysis tool comprises a static analysis module. The static analysis uses a static analysis technique to automatically determine whether or not the extension body satisfies the policy, to provide a verification result. If the browser extension passes this test, an end user may install and run the browser extension without performing runtime safety analysis on the browser extension (because the static analysis has guaranteed that the browser extension will satisfy the policy).

According to another illustrative aspect, the extension body is formulated using a language that accommodates static type-checking, such as the language Fine.

According to another illustrative aspect, the extension body is formulated against at least one application programming interface (API), wherein the API includes logical pre-conditions and post-conditions. The logical pre-conditions and post-conditions can be expressed using refinement types.

According to another illustrative aspect, the static analysis involves modeling a runtime behavior of the browser extension by accumulating a monotonically-increasing set of facts about the extension body during the symbolic execution of the extension body. The monotonic nature of the modeling ensures that the extension body will continue to satisfy the policy for any runtime interleaved execution of unverified page script code (e.g., JavaScript) and browser extension code.

According to another illustrative aspect, the environment includes a conversion module that converts a browser extension (that has been deemed safe) to at least one format that is compatible with at least one target browser type, selected from a set of possible target browser types. This aspect allows different types of browsers to receive browser extensions produced and tested using the above-summarized analyses.

According to another illustrative aspect, the environment may receive a "legacy" browser extension that is not in a form that readily accommodates static analysis. The environment can include a translation module that converts at least part of this legacy browser extension into a form that enables it to be processed using the above-summarized types of analyses.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7 shows a simplified example of a policy expressed in a logic-based specification language.

FIG. 8 shows a collection of predicates that can be used to create a policy.

FIG. 11 includes an example of an application programming interface (API) which includes logical pre-conditions and post-conditions, which can be expressed using refined types. Browser extensions can be programmed against such an API.

FIG. 12 shows another example of a policy.

FIG. 13 shows an example of an extension body that is associated with the policy of FIG. 11, and which is generated against the API of FIG. 11.

FIG. 14 shows another example of an API, policy, and extension body associated with another browser extension.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative environment for developing, analyzing, disseminating, and using secure browser extensions. Section B describes illustrative methods which explain the operation of the environment of Section A. Section C describes illustrative processing functionality that can be used to implement any aspect of the features described in Sections A and B.

Figure 19:
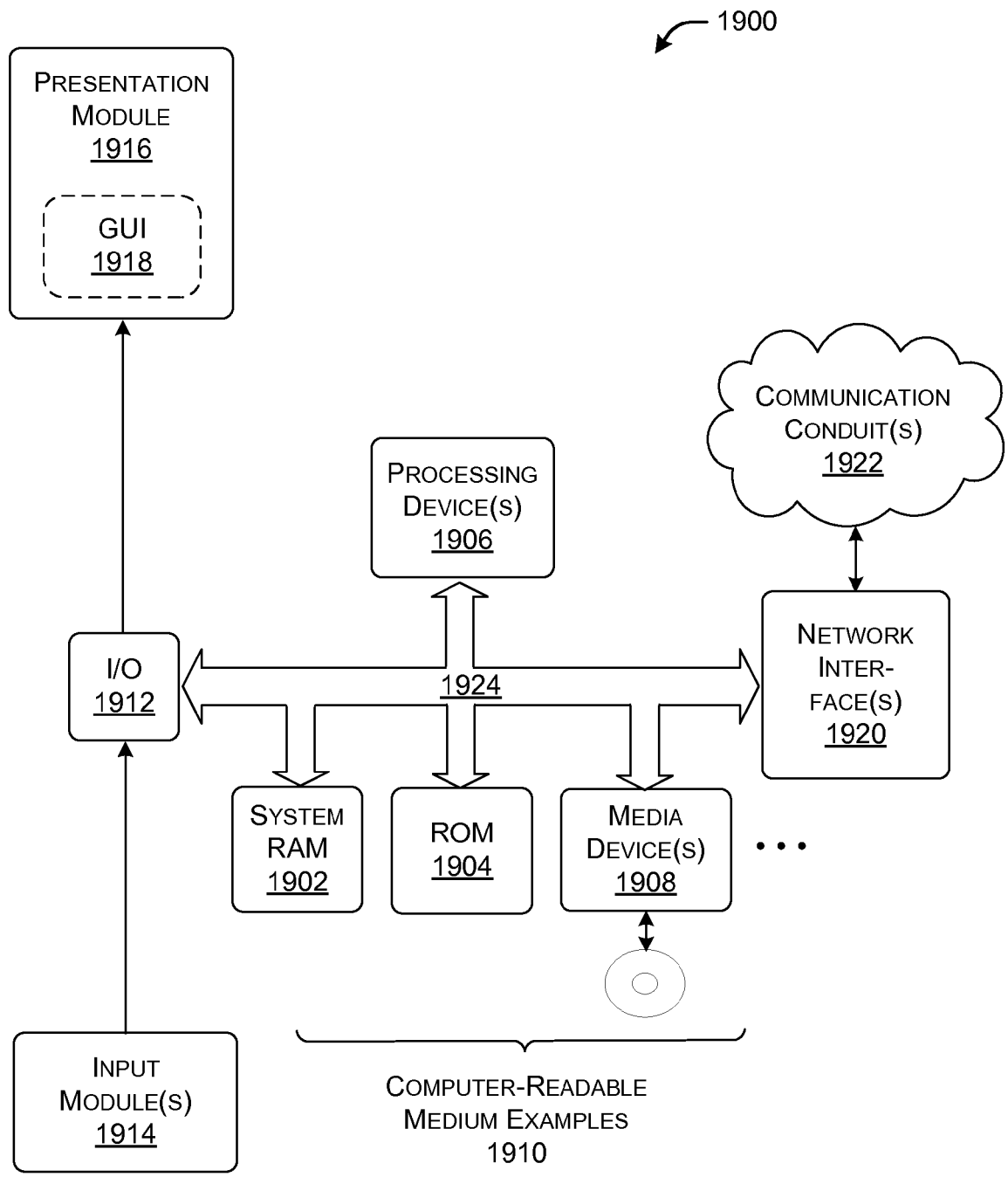
FIG. 19 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (for instance, by software, hardware, firmware, etc., and/or any combination thereof). In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 19, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (for instance, by software, hardware, firmware, etc., and/or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Environment

A.1. Overview

Figure 1:
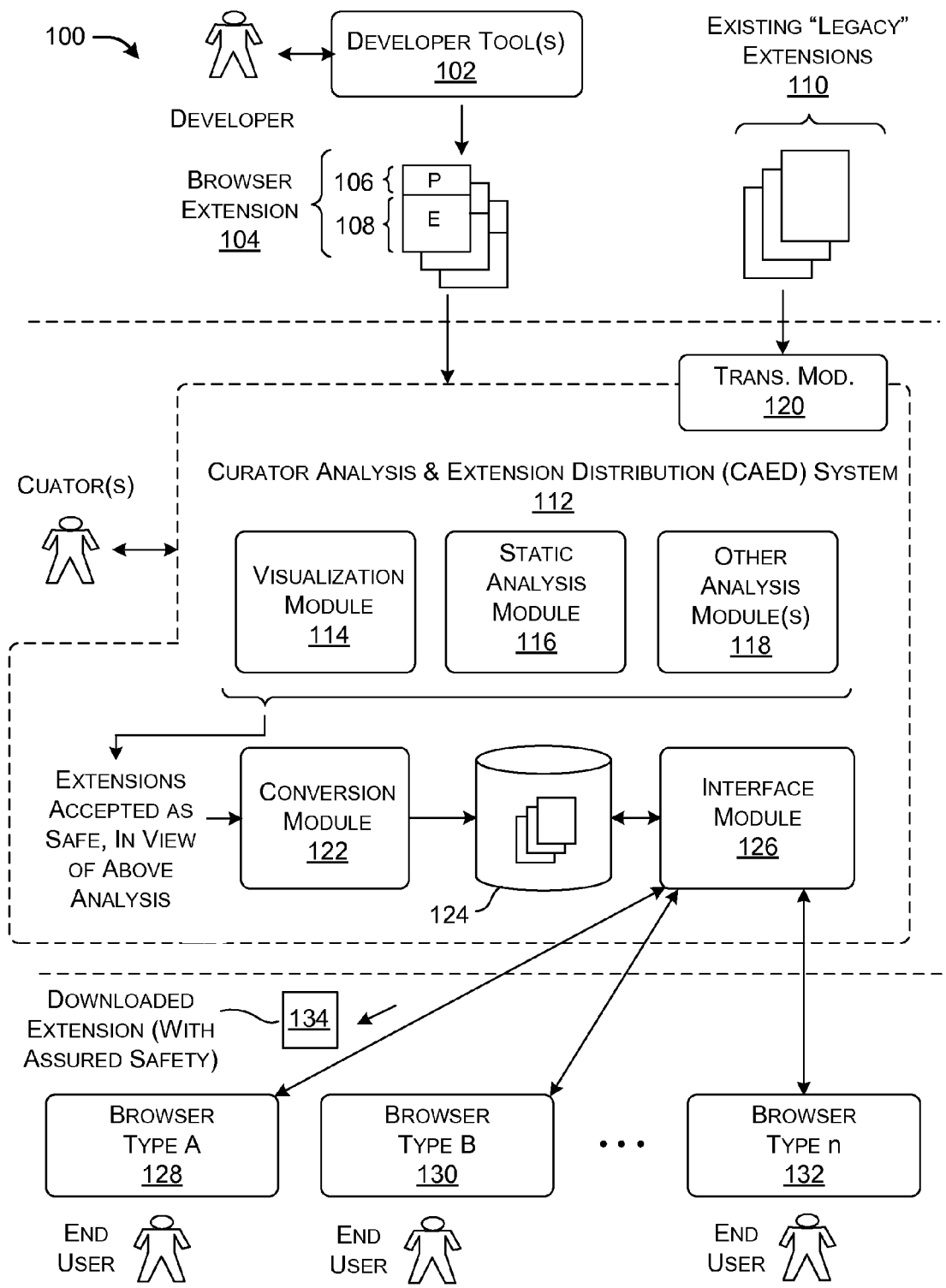
FIG. 1 shows an illustrative environment for generating, analyzing, and using secure browser extensions. Each browser extension can include an extension body and a policy which describes fine-grained privileges granted to the extension body.

FIG. 1 shows an environment 100 that involves the development, analysis, distribution, and use of secure browser extensions. More specifically, the environment 100 includes three realms. The top part of FIG. 1 corresponds to a development realm. This realm includes functionality for developing or otherwise providing browser extensions. As used herein, a browser extension refers to any functionality which extends or supplements the operation of a browser in any manner. The middle part of FIG. 1 corresponds to a curator realm. The curator realm includes functionality for analyzing, converting, and disseminating browser extensions that are deemed secure. And the bottom part of FIG. 1 corresponds to an end user realm. The end user realm includes functionality for running the browser extensions in respective browsers of different kinds. This introductory section presents an overview of each these realms.

Starting with the development realm, a developer can use developer tool(s) 102 to author a browser extension, such as the representative browser extension 104. The representative browser extension 104 includes two portions: a policy 106 and an extension body 108. As will be described below, the extension body 108 includes logic which carries out the functions of the browser extension 104. The policy 106 specifies the privileges granted to the extension body 108 in a fine-grained manner. In other words, the policy 106 identifies the operations that the extension body 108 is entitled to perform.

In addition, various browser extensions 110 may exist which have been authored in formats that are not readily suited for analysis in the curator realm. These browser extensions 110 are referred to herein as "legacy" extensions to indicate that they may predate the provisions described herein (associated with the creation and analysis of the representative browser extension 104).

The curator realm includes a curator analysis and extension distribution (CAED) system 112. The CAED system 112 includes two basic suites of functionality. A first suite of functionality analyzes browser extensions that have been submitted to the curator realm. As will be described below, the analysis performed by this functionality aims to determine whether the browser extensions are safe. A second suite of functionality converts the browser extensions that have been deemed safe to various forms that are compatible with respective types of browsers. In general operation, the CAED system 112 operates by receiving candidate browser extensions from various developers and other sources. The CAED system 112 performs various tests on the browser extensions to determine if the browser extensions are deemed safe. The CAED system 112 then makes the secure browser extensions available for download to end users, upon requests by those individual end users.

More specifically, the suite of analysis tools may include a visualization module 114, a static analysis module 116, and one or more other analysis modules 118. The visualization module 114 presents a visual depiction of the features of a resource, such as a target network-accessible page, that are accessible to the policy 106 of the browser extension 104. Such a network-accessible page may correspond to a web page that is accessible via the Internet, referred to below as simply a "page" for brevity. The static analysis module 116 applies a static analysis technique to determine whether the extension body 108 satisfies the policy rules of the policy 106. The other analysis module(s) 118 can perform other safety-related testing on the browser extension 104, to be described below.

In addition, the CAED system 112 can perform analysis on a legacy extension. To do so, the CAED system 112 can use a translation module 120 to convert at least part of the legacy extension into a form that accommodates safety-related testing by the CAED system 112.

If a browser extension 104 is deemed safe, a conversion module 122 can then convert the browser extension 104 into one or more forms that are compatible with one or more types of browsers (e.g., where the different browsers may be provided by different browser developers). More specifically, prior to conversion, the browser extension 104 may exist in a language that accommodates static analysis. The conversion module 122 operates to convert the browser extension 104 from this analysis-friendly form to one or more forms that are executable by one or more respective browsers. The conversion module 122 stores the converted browser extension in a data store 124, adding it to a collection of other converted browser extensions that have been deemed safe. An interface module 126 disseminates the converted browser extensions to end users, e.g., upon request from the end users.

The user realm comprises a plurality of user devices (not shown) which host respective browsers. The browsers may have different types, e.g., produced by different respective browser developers. For example, FIG. 1 shows a browser type A 128 implemented by a first user device, a browser type B 130 implemented by a second user device, a browser type C 132 implemented by a third user device, and so on. For example, FIG. 1 shows that an end user who operates browser type A 128 is in the process of downloading a browser extension 134 that is compatible with the browser type A 128.

A browser extension which is downloaded from the CAED system 112 is assured to be secure by virtue of the static analysis and other testing performed by the CAED system 112. As such, a user can install the browser extension with confidence that it will not overstep the bounds of the privileges specified by its policy. For the same reason, the execution of the browser extension by the browser need not invoke safety-related runtime analysis on the browser extension.

Figure 2:
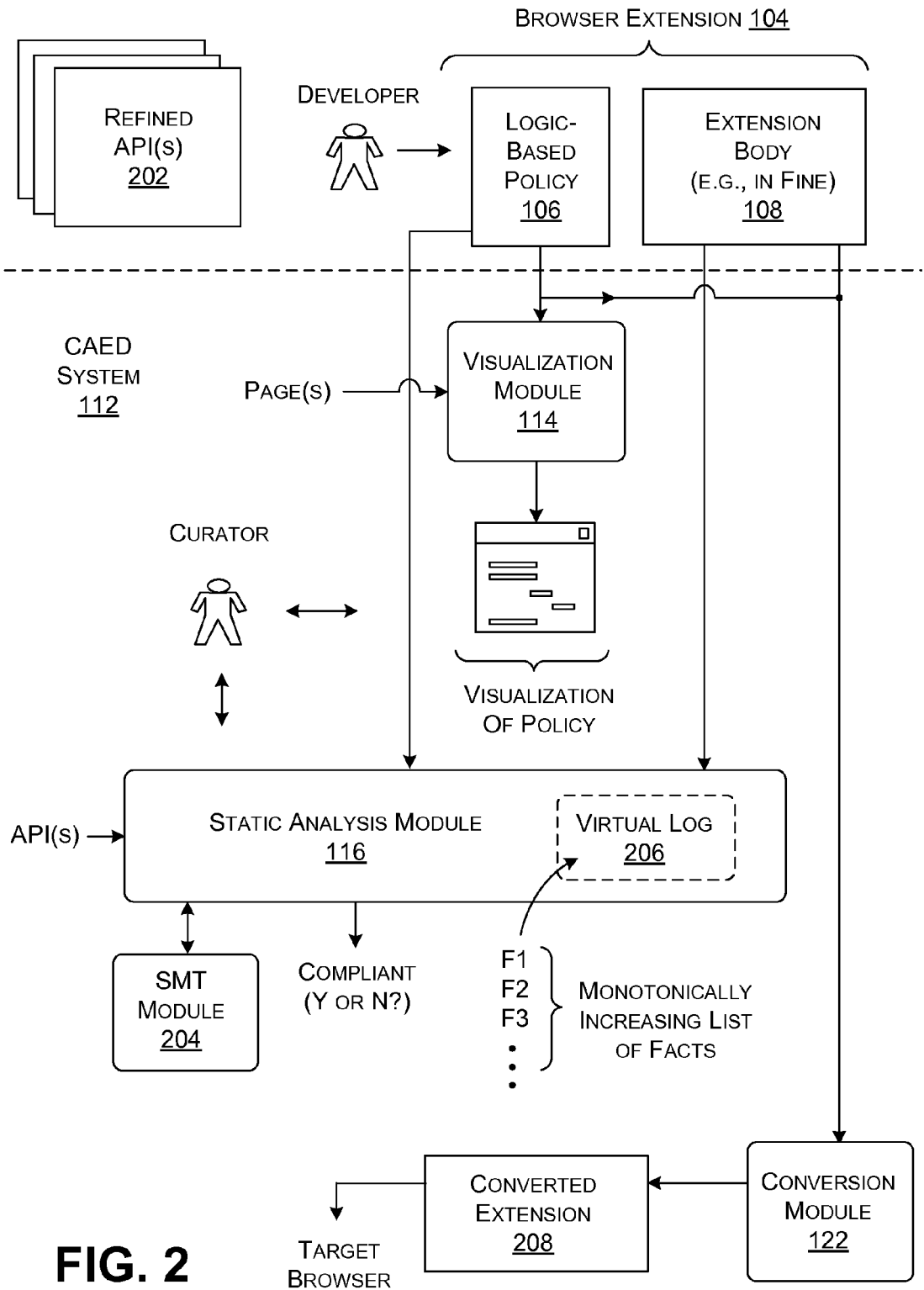
FIG. 2 shows additional illustrative details regarding a curator system provided by the environment of FIG. 1.

Advancing to FIG. 2, this figure shows additional details regarding the development realm and the curator realm. Starting with the development realm, a developer can create the extension body 108 against one or more application programming interfaces (APIs) 202. The API(s) 202 provide functionality that can be invoked by the extension body 108 in order to interact with pages, to access local storage of a user device, to access network-accessible sites, and/or to perform other functions. As will be described in greater detail below, the API(s) 202 can be annotated with logical pre-conditions and post-conditions, which can be expressed using refinement types. A type generally describes the nature of a feature (such as a function) that appears in the API(s) 202. A refinement type describes a predicate that further qualifies a type. A post-condition sets forth a predicate that is deemed to be true following the execution of some operation. A pre-condition sets forth a predicate that is expected to be satisfied prior to the execution of the operation. In one case, a developer can download the API(s) 202 from the CAED system 112. That is, the developer may not be tasked with the responsibility of authoring the API(s) 202.

More specifically, the developer can produce the extension body 108 in a language which readily accommodates static analysis, such as a high-level type-safe language. Without limitation, one such language is the language Fine; Fine is described in Nikhil Swamy, et al., "Enforcing Stateful Authorization and Information Flow policies in Fine," *Lecture Notes in Computer Science*, Vol. 6012, 2010, Springer-Verlag Berlin Heidelberg, pp. 529-549. Fine is a dependently typed ML dialect, and is a functional subset of F#. The principal feature of Fine is its type system, which is designed to support static verification of safety properties via a mixture of refinement and sub-structural types.

A developer can create the policy 106 in any type of logic-based specification language. For example, a developer can author the policy 106 in the first-order logic language Datalog. Datalog is a variant of Prolog. But Datalog applies various simplified assumptions (compared to Prolog) which ensure that programs produced in Datalog will terminate. Of particular bearing to the present description, Datalog programs employ restricted use of negation. Information on Datalog is readily available in the literature, such as in Robert Combs, *Deductive Databases and Their Applications*, CRC Press, 1998.

As will be described in greater detail below, the developer can produce the policy 106 so that it specifies fine-grained privileges. In some cases, the privileges describe the parts of a page (and/or other resources) that the browser extension 104 is entitled to access. These privileges are referred to as access control privileges. In addition, the privileges can describe constraints among resources, such as by specifying the manner in which the browser extension 104 is permitted to interact with a third-part entity, e.g., by transferring information from a page that the end user is viewing to another website. These privileges are referred to herein as dataflow privileges. In general, these privileges empower a developer to pinpoint specific parts of a page and/or other resources by leveraging the structure and/or content of the resources.

Upon receipt of the browser extension 104 at the CAED system 112, the visualization module 114 can be used to instantiate the policy 106 with respect to a particular page or other resource. The visualization module 114 performs this task by highlighting the parts of the page that the policy 106 entitles the browser extension 104 to access or the parts of the page that are otherwise impacted by the policy. In this manner, the curator can be given a way of quickly and easily understanding the nature and scope of the policy 106. But this approach does not exhaustively reveal the security-related impact of the policy 106. This is because the browser extension 104 may be designed to interact with many different pages, and it may be impractical for the user to instantiate the policy 106 for each of the pages. In addition, or alternatively, the policy 106 may impact only a specific part of a particular type of page. The user may be unsuccessful in discovering the page that is impacted by the policy 106.

The static analysis module 116, by contrast, provides a thorough determination of whether the extension body 108 satisfies the policy 106. As the name suggests, the static analysis module 116 performs analysis on the extension body 108 in a static manner, rather than during the runtime execution of the extension body 108. In one approach, the static analysis module 116 can be implemented as a Fine type checker which performs type-checking on extension bodies expressed in the language Fine, identified above.

The static analysis module 116 can rely on a Satisfiability Modulo Theories (SMT) module 204 to perform reasoning during the analysis of the extension body 108. One SMT module 204 that can be used is the Z3 SMT module provided by Microsoft Corporation of Redmond, Wash. The Z3 SMT module is described in various publications, including Leonardo de Moura, et al., "Z3: An Efficient SMT Solver," *Lecture Notes in Computer Science*, Vol. 4963, 2008, Springer-Verlag Berlin Heidelberg, pp. 337-340.

The static analysis module 116 operates by investigating the extension body 108 in the symbolic domain. As the analysis proceeds, the static analysis module 116 learns facts about the extension body 108, thereby gaining an increasingly refined understanding of the nature of the extension body 108. The static analysis module 116 stores these facts a virtual log 206. Eventually, the static analysis module 116 can reach a conclusion as to whether or not the extension body 108 complies with the rules specified by the policy 106.

More specifically, the virtual log 206 models the runtime behavior of a browser extension by maintaining a monotonically-increasing set of facts about the extension body 108. The qualifier "monotonic" means that a property that is assessed as true at time t1 will remain true during the subsequent analysis of the extension body 108. This property ensues from the restrictions placed on negation by the logic-based specification language. The significance of this property with respect to the static type-checking will be explained below in subsection A.3.

Finally, FIG. 2 shows the use of the conversion module 122 to convert the browser extension 104 into a form that is compatible with at least one type of browser, producing a converted extension 208. This conversion operation may act on the extension body 108, or both the extension body 108 and the policy 106.

Figure 3:
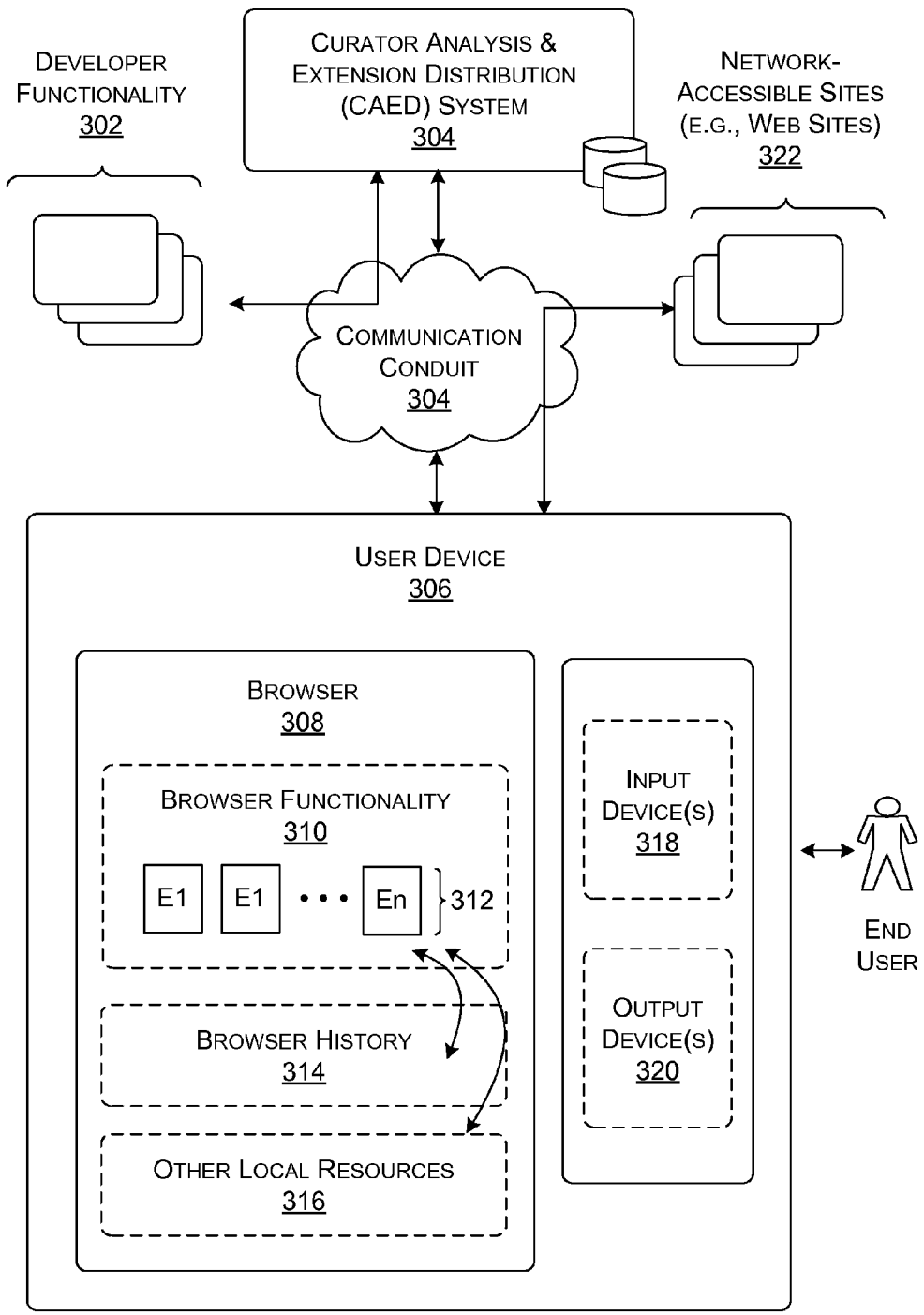
FIG. 3 shows one illustrative implementation of the environment of FIG. 1.

FIG. 3 shows one implementation of the environment 100 introduced in FIG. 1. In this implementation, the CAED system 112 can be implemented by one or more server computers in conjunction with one or more data stores and other computer processing equipment. The CAED system 112 can be provided at a single site or can be distributed over plural sites. One or more developers can use developer functionality 302 to interact with the CAED system 112 via a communication conduit 304. The developer functionality 302 can include computer devices of any type, data stores, and other computer processing equipment. The communication conduit 304 can comprise any type of coupling mechanism, such as a local area network, a wide area network (e.g., the Internet), one or more point-to-point connections, and so on. The communication conduit 304 can be implemented using any combination of hardwired links, wireless links, routers, gateways, name servers, etc., as governed by any protocol or combination of protocols.

Various user devices can also interact with the CAED system 112, such as illustrative user device 306 operated by an end user. The user device 306 can be implemented by any computing functionality, such as a personal computer, a computer workstation, a laptop computer, a game console device, a set-top box, a personal digital assistant device, a mobile telephone device, a book reader device, and so on.

In one implementation, the user device 306 may host a browser 308 of a particular type. The browser 308 includes browser functionality 310 which implements its core logic. The browser functionality 310 can also be supplemented by one or more browser extensions 312 which can be downloaded from the CAED system 112. The browser 308 can also interact with a browser-local storage, e.g., providing a browser history 314 and other local resources 316. A browser history describes the network-accessible sites that the user has visited in one or more browser sessions.

In another implementation, all or part of the browser 308 is implemented in remote fashion by network-accessible resources. The end user can use the user device 306 to interact with these remote browser resources.

Finally, the user device 306 includes one or more input devices 318 and one or more output devices 320 for interacting with the browser 308. The input devices 318 can include any combination of a key input device, a mouse device, a touch-sensitive input device, and so on. The output devices 320 can include any combination of a display mechanism, a printer, etc.

An end user may use the browser 308 to access one or more network-accessible sites 322 via the communication conduit 304. The network-accessible sites 322 can provide any information and/or services via one or more network-accessible pages (e.g., web pages).

The environment 100 has various potential benefits. In one case, the environment 100 allows a developer to provide a browser extension that has privileges which are narrowly tailored to the tasks performed by the browser extension. This provides greater protection and assurances to the end users. By contrast, in the above-described runtime privilege-checking approach, the rights specified by its browser extension models are too coarse-grained. For example, a manifest in the runtime privilege-checking approach may grant a browser extension the right to access all of the content associated with a web page and/or the entire user's browsing history. Thus, even though the runtime privilege-checking approach provides some degree of transparency in the installation process, it may fail to suitably safeguard sensitive data. In addition, the environment 100 can entirely eliminate (or at least reduce reliance on) runtime analysis of browser extensions, unlike the runtime privilege-checking approach. These potential advantages of the environment 100 are mentioned by way of example, not limitation.

A.2. Generation, Analysis, and Use of the Policy

Having now set forth an overview of the environment 100, the remainder of Section A will describe individual aspects in of the environment 100 in greater detail. To begin with, FIG. 4 describes the behavior of a representative browser extension, which will serve as a running example herein. The browser extension is invoked when the end user visits a page 402 provided by a social networking site. For example, the page 402 provides information regarding a hypothetical friend of the end user, named John Smith. The browser extension then extracts contact information 404 from the page 402 and sends it to a third party entity, such as an address book 406 maintained by another website. More specifically, the contact information that is extracted and transmitted corresponds to website links that appear on the page 402.

The browser extension may also pose risks. For example, there is a risk that the browser extension may overstep its bounds and extract more information than the website links. There is also a risk that the browser extension can make undesirable modifications to the page 402 and/or send extracted information to non-authorized third party entities, and so on. The browser extension described herein removes these concerns.

The developer may begin by creating a policy that specifies the privileges which entitle the browser extension to perform the above-described tasks. In some cases, the developer may design a policy that targets one particular page (or other resources). In other cases, the developer may design a policy that implicates a collection of pages (or other resources). For example, the developer can construct a policy which uses wildcard characters to refer to a group of pages hosted by a particular website. This subsection provides additional information regarding the characteristics of the policy, its analysis, and its manner of use in conjunction with an extension body.

Figures 4, 5:
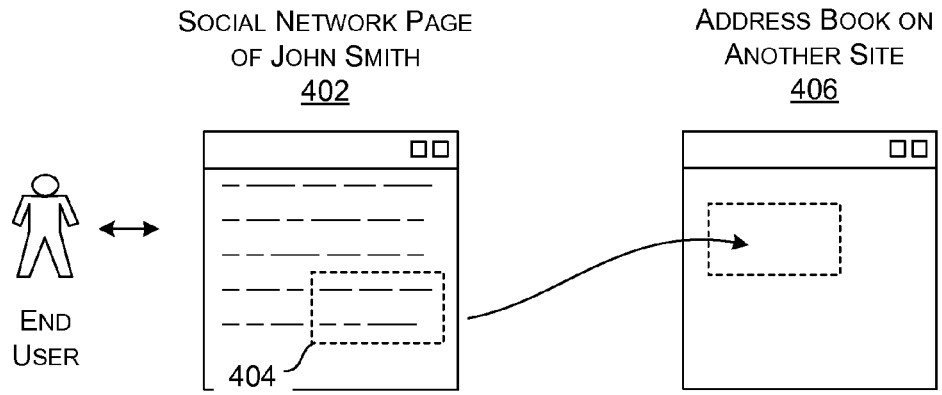
FIG. 4 is a graphical representation of the behavior of an illustrative browser extension.
FIG. 5 shows a portion of a markup language document, including a part that is accessible to a browser extension.
Figure 6:
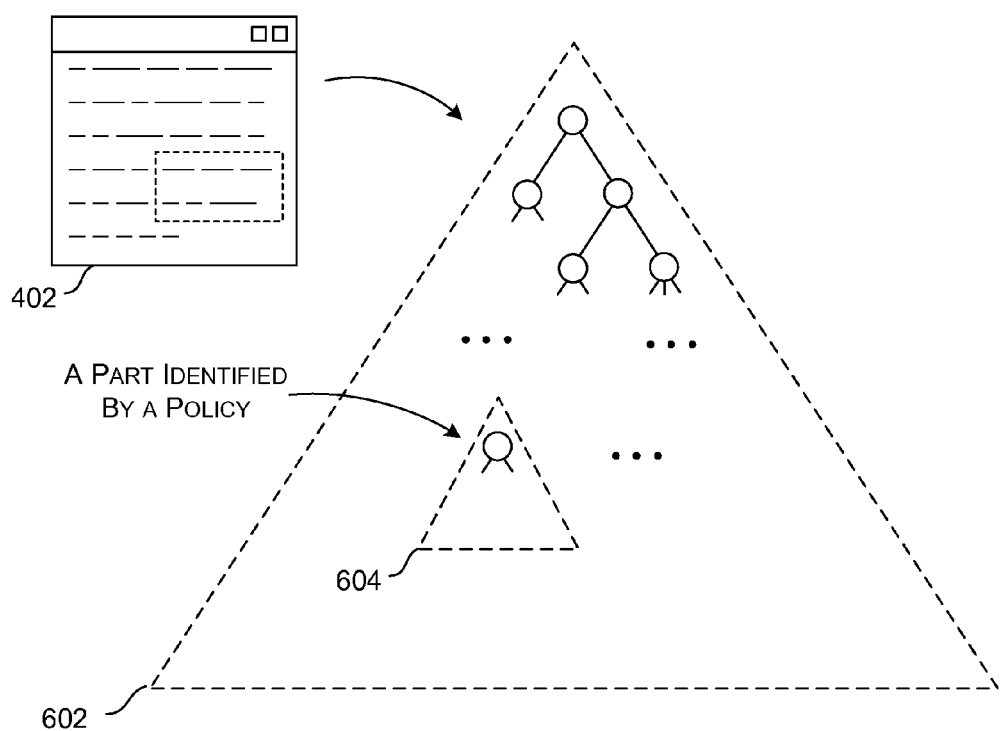
FIG. 6 is document object model (DOM) representation of the markup language document of FIG. 5, used to interact with that document.

FIGS. 5 and 6 together describe, in high-level form, the manner in which a policy can selectively target parts of the page 402 of FIG. 4. As shown in FIG. 5, the page 402 can be expressed in a markup language, such as HTML (which can be viewed as a specific form of XML). In this format, the page 402 includes a hierarchically-arranged collection of elements. An element may specify at least one attribute and an associated value, among other information. For example, the page 402 includes the element 502, namely "<div class="website">. This element 502 is demarcated by "div" tags and includes an attribute ("class") and an attribute value ("website").

FIG. 6 shows a document object model (DOM) representation of the page 402. A program can interact with the page 402 using the DOM. The DOM can be conceptualized as a tree 602 of objects (or some other data structure which organizes the objects). The tree 602 presents the objects as nodes.

The policy can pinpoint particular parts of the page 402 by leveraging the markup language structure and content of the page 402. For example, the policy may include one or more rules which grant the browser extension the right to investigate all nodes having the attribute of "class." The policy can specify one or more other rules which allow it to extract any website information subsumed under a "<div class="website"> node. Assume that such a rule targets part 604 in the page 402. The part 604 may comprise sub-tree insofar as the node "<div class="website"> may have one or more child nodes. The policy rule may allow the browser extension to extract information provided in those child nodes, associated with link content 504 shown in FIG. 5.

FIG. 7 provides a more formal expression of a simplified version of a policy 700. Generally stated, the policy 700 allows an extension body to read text contained within "<div class="website"> elements. That is, the policy states that, for all DOM elements e and p on a page, if p is the parent of e, and if p corresponds to a "<div>" node, and if p has the "class=website" attribute-value pair, then the extension body is granted the "CanRead" privilege on element e.

Although not shown, a policy can also provide rules which express network-accessible site(s), e.g., in one case, corresponding to websites, with which a page may interact. The policy can construct such a rule by leveraging the manner in which such site(s) are identified, e.g., using URLs or other resource identifiers. For example, a policy can specify a rule which permits the extension body to interact with a group of pages associated with a site by identifying the URL of that site, together with appropriate wildcard characters that provide a desired scope of generality. In addition, a policy rule can specify a portion of a user's browsing history which is accessible to the extension body (if any). For instance, in some cases, a policy can permit the extension body to access a portion of the user's browsing history that pertains to interaction with a particular site. These access rights are mentioned by way of example, not limitation; a policy may describe additional types of rights.

Certain predicates in the policy 700 pertain to markup features in the page, such as "EltParent e p," "EltTagname p 'div'," and "EltAtrr p 'class' 'website'." "EltParent" is a predicate which states that node p is the parent-element of node e. "EltTagname p 'div'" states that the tag name of p is "div." "EltArr p 'class' 'website'" states that the node p has an attribute "class" with value "website." This general class of predicates is referred to as metadata predicates. More generally stated, metadata predicates are applicable to the structure and content of resources accessible to the browser extension, the resources including at least one of: network-accessible pages; browser-local storage; resource identifiers; and network messages, etc. Further, the collection of metadata predicates is customizable. The predicate "CanRead e", by contrast, is a member of a class of permission predicates. Permission predicates define permissions granted to the policy 700 over the resources. More specifically, FIG. 8 describes a collection of metadata predicates and a collection of permission predicates for one particular implementation of the environment 100. Note that the simplified "CanRead" permission predicate in FIG. 7 is replaced with predicates (in FIG. 8) that more finely define the information on a page which the policy is permitted to read.

A policy can be integrated with an extension body (and associated APIs) in different ways, depending on the semantics of the overall programming model adopted by the environment 100. For example, according to one model, certain aspects of a page (or other resource) are considered non-sure, and certain parts are considered sensitive and secret. For example, in one implementation, the model can regard the tag structure and some of the attribute structure as non-secure. For example, the model can consider a CSS class attribute as pertaining to non-secure information. Generally, all of the non-secure information defines security metadata. In contrast, the model can view the text, links, images, and all other content on a page as sensitive and secret. The model permits a browser extension to access the security metadata without the granting of explicit privileges to do so. In contrast, the model makes the accessing of secret information contingent on the granting of explicit privileges.

The above design objectives can be achieved by annotating certain DOM-interaction operations with logical pre-conditions and post-conditions. For instance, assume that the browser extension includes a command which seeks to alter an attribute s of a node n to a value v, e.g., using a "setAttr" command. The model may regard an attempt to modify an attribute in this manner as a security-sensitive event. As such, the command to write to an attribute can be annotated with a pre-condition which seeks to ensure that the browser extension has permission to write to the attribute in question. This pre-condition can invoke the "CanWriteAttr" predicate (described in FIG. 8) to perform the appropriate checking. The static analysis module 116 can evaluate the "CanWriteAttr" predicate by determining whether this condition is derivable from the policy and from the facts in the virtual log 206.

Next assume that the browser extension invokes a command that seeks to access security metadata in the DOM, which is considered non-secure. This command is therefore not annotated with a pre-condition. But such a command can be annotated with a post-condition which invokes one of the metadata predicates. When symbolically executed, this post-condition can prompt the static analysis module 116 to record facts in the virtual log 206. In one example, the facts may express the parent/child relationships between the nodes in question. These facts can be used in subsequent security checks to grant privileges to browser extension.

Next assume that a browser extension includes a request to access an attribute s of a node n in the DOM, having a value v. The attribute may potentially pertain to secret information. Thus, a command to get the attribute ("getAtrr") can be annotated with a pre-condition which seeks to ensure that the browser extension has permission to get the attribute in question. This pre-condition can invoke the "CanReadAttr" predicate to perform the appropriate checking During symbolic execution, the static analysis module 116 can also record facts in the virtual log 206 at the completion of this security check. For instance, a first fact indicates that the node n indeed has the attribute-value pair (s and v) in question. A second fact records the fact that the value v was derived from the node n.

More specifically, one or more API(s) can be annotated with the above-described refinement types (e.g., pre-conditions and post-conditions) to provide refined API(s). For example, a first refined API can be used to interact with the DOM. A second refined API can be used to interact with the local storage, network resources, and browsing history. The extension body can, in turn, invoke various refined API(s). In this manner, the model can integrate the rules of the policy with the extension body. For example, the extension body may contain a command to write to an attribute in a page. To perform this function, the extension body invokes an appropriate operation in a refined DOM API. That operation may be annotated with a pre-condition which specifies that the extension body is expected to have explicit permission to modify the attribute. And to make this determination, the static analysis module 116 can examine the policy assumptions in the policy and the facts in the virtual log 206. The description below will set forth a detailed example of this manner of analysis.

Figure 9:
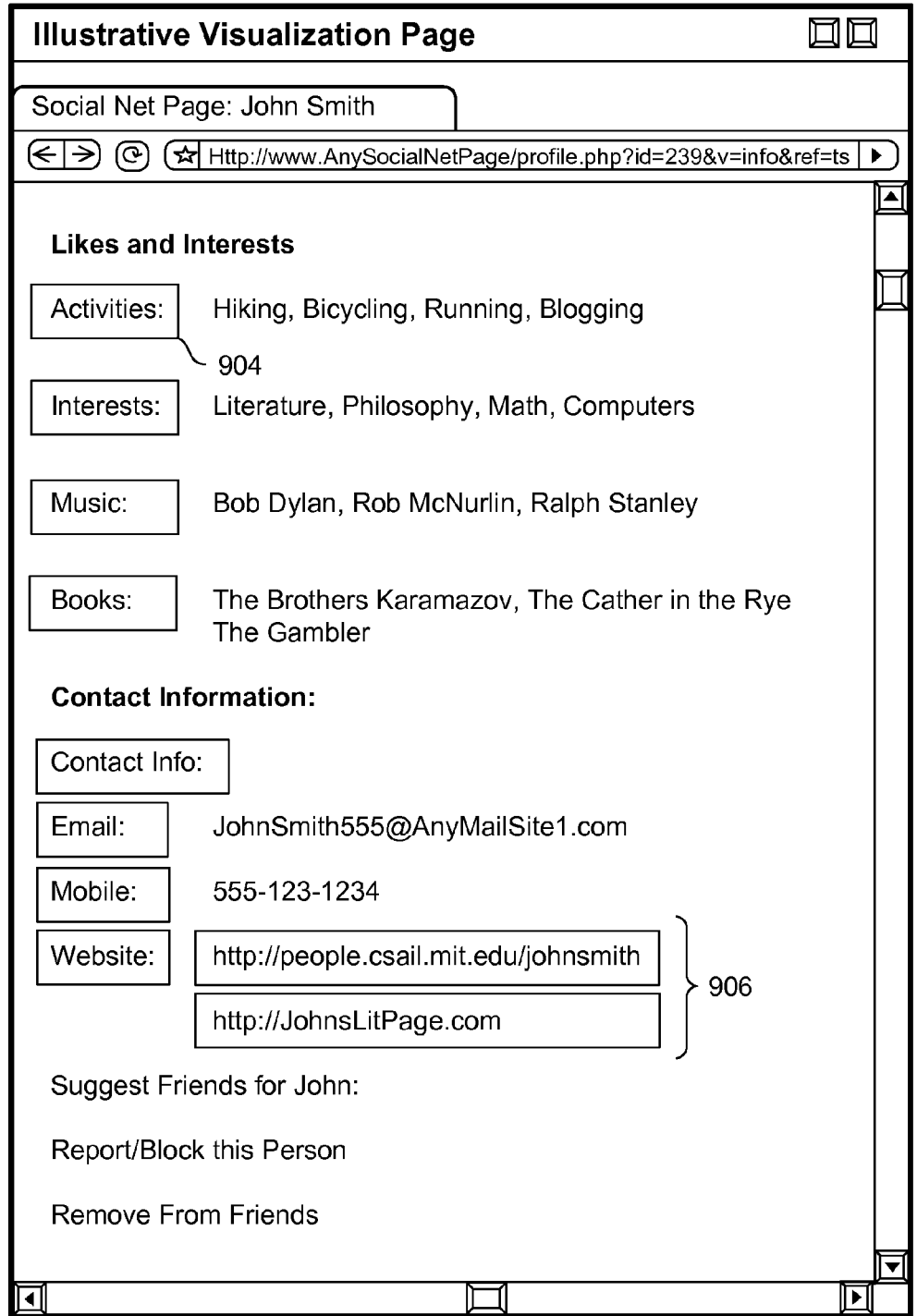
FIG. 9 shows a user interface presentation which identifies features of a network-accessible page that are accessible to a policy.

Advancing to FIG. 9, this figure shows a user interface presentation 902 produced by the visualization module 114. The visualization module 114 applies the policy of a browser extension to a particular page or other resource. For example, in the example of FIG. 4, the purpose of the browser extension is to extract certain pieces of information from a social network page, e.g., page 402. Hence, the curator may test the policy by instantiating it for a particular page of that website. In the case of FIG. 4, the curator has applies the policy to a page associated with a friend having the hypothetical name John Smith.

The visualization module 114 can highlight the parts of the page that the policy is entitled to access or are otherwise impacted by the policy. For example, assume that the policy grants the browser extension the right to access all nodes having the "class" attribute. In view of this, the visualization module 114 highlights any content in the page associated with this markup content, such as the label "Activities" 904. As described above, the policy also specifically grants the browser extension the authority to read the website-related text subsumed under the node "<div class='website'>". Hence, the visualization module 114 highlights the link content 906 associated with that node. Generally, the rules in the policy act as selectors which pick out particular parts of the page.

The user interface presentation 902 provides a readily understandable mechanism for revealing the scope of the privileges associated with the browser extension. That is, at a glance, the curator can gain insight as to what parts of a page the browser extension can access and which parts it cannot access. For example, the user interface presentation 902 reveals that the browser extension is not permitted to access the text associated with the "Activities" label, the "Interest" label, and so on.

In the above example, the assumption is made that the curator, who may be affiliated with the CAED system 112, operates the visualization module 114 to produce the user interface presentation 902. But other users can also perform this operation, such as end users.

The CAED system 112 can employ other tools which examine the policy of the browser extension. For example, a pattern analysis module (not shown) can examine the policy to determine if it contains undesirable patterns. For example, a policy is suspect if it grants a browser extension the privilege to modify a page in a manner that allows the browser extension to grant itself access to protected resources. The following policy exemplifies this undesirable pattern:

$\forall$ e CanWriteAttr e "class"

$\forall$ e, k. EltAttr e "class" "readable"$\rightarrow$CanReadValue e.

Here, the attribute ("Class") which protects access to an element is mutable by the browser extension. To detect such a situation, the pattern analysis module can enumerate the set of attributes over which the browser extension has write privileges. The pattern analysis module can then perform a syntactic check to ensure that none of these attributes ever appear within a metadata predicate.

In another case, an analysis module can determine the scope of a policy, e.g., by determining the number of web pages that are accessible by the policy, or the extent of the browser history that is accessible by the policy. This analysis module can then provide any type of metric (or metrics) which convey the scope of the policy to the curator.

In another case, an analysis module can perform analysis which determines if there are any conflicts among two or more browser extensions. For example, two or more browser extension may attempt to access the same part of the same page. This may create conflicts which render the performance of the browser extensions unstable, even though each browser extension is deemed safe when considered in isolation. This analysis can be performed by examining just the policies of the browser extensions, or the policies in conjunction with their respective extension bodies (e.g., using static analysis, described below).

These types of analyses are cited by way of example, not limitation. The CAED system 112 can incorporate yet other types of analysis tools which examine the policies of the browser extensions.

As a final topic in this subsection, a developer can generate the policy in different ways. In one approach, a developer can manually write the extension body, followed by the policy. In another approach, the developer can manually write the policy first, followed by the extension body. In another approach, the developer can write the policy and extension body together as a single exercise.

In another case, the developer can first write the extension body. The developer can then use an automated (or semi-automated) tool to derive the policy based on the extension body. Such a tool can first determine the content in a page (and/or other resource(s)) that the extension body is designed to access. In many cases, the extension body is directed to a particular page having a particular structure, or a finite collection of such pages and structures. As such, the tool can next determine the structure of the page(s) that are targeted by the extension body. The tool can then automatically construct a policy which includes appropriate metadata predicates to pinpoint the parts of the page(s) to which the extension body demands access. The tool can then choose appropriate permission predicates which enable the extension body to perform its specified tasks on the targeted parts.

A.3. Static Analysis of Browser Extensions

As described above, the static analysis module 116 performs static analysis on the policy and the extension body, in conjunction with any APIs implicated by the extension body. This yields a verification result that indicates whether or not the extension body satisfies the rules in the policy. However, when the browser extension is actually executed by a browser, the browser extension may run in conjunction with page-resident script code (e.g., JavaScript). In view of this, the more specific goal of the static analysis module 116 is to determine whether the browser extension satisfies the policy for any arbitrary interleaving of extension code and page script code. This safety property is referred to herein as execution safety, since the safety property implicates any unanticipated interleaving of extension code and page script code during the execution of the browser extension.

Figure 10:
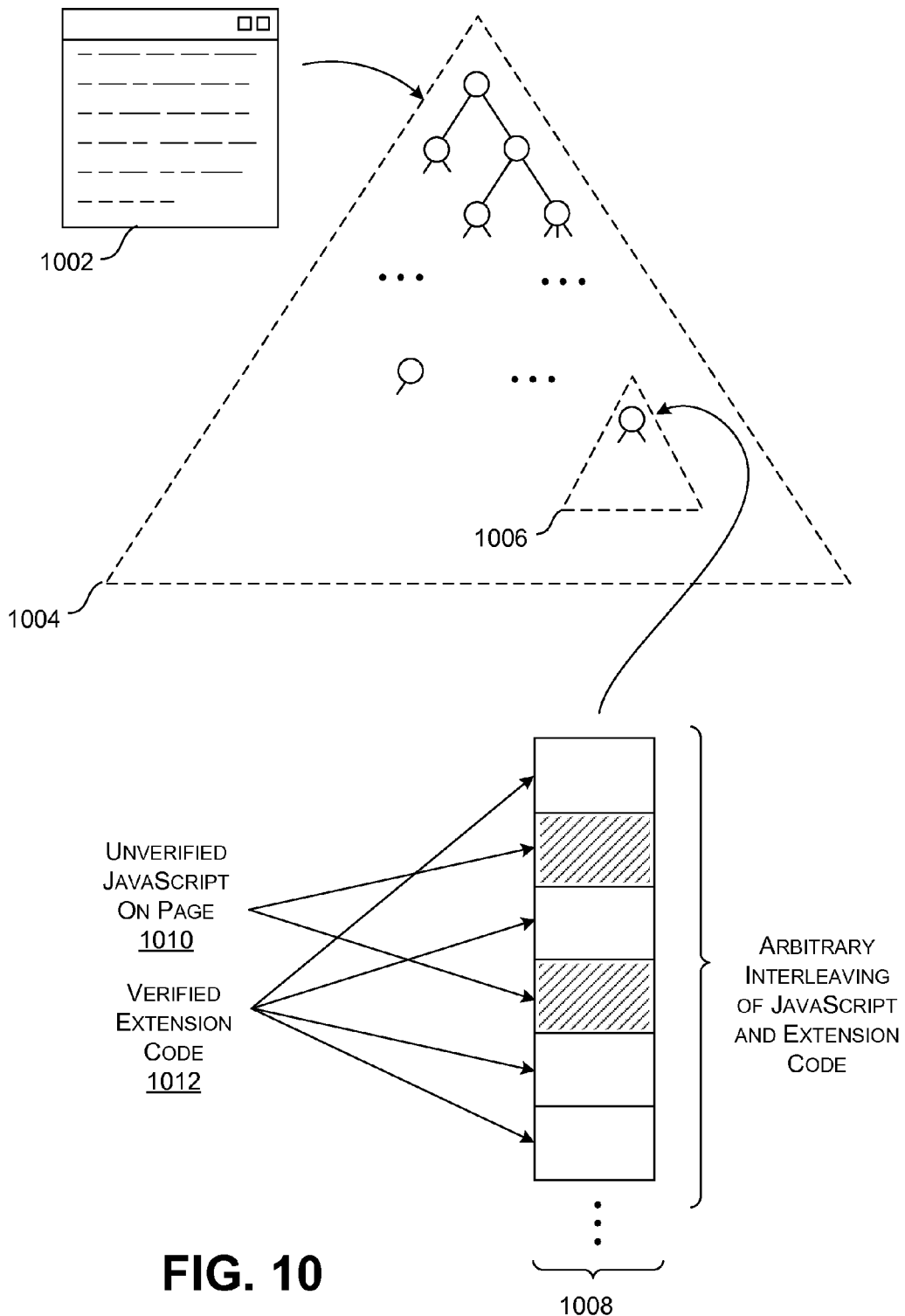
FIG. 10 is a graphical representation of a manner in which a browser can arbitrarily interleave execution of unverified and unanticipated page script code (e.g., JavaScript) with trusted extension code.

FIG. 10 clarifies the above concepts by showing the manner in which a browser operates on a particular page 1002. The page 1002 can be represented in DOM as a tree 1004. The tree 1004 includes a hierarchy of nodes. Assume, at this particular juncture in time, that the browser is operating on a particular part 1006 in the hierarchy defined by the tree 1004. Assume that these operations involve execution of page script associated with the part 1006. Further assume that, at this juncture, a browser extension also seeks to perform operations which impact the part 1006.

A typical browser will create a queue 1008 comprising plural blocks of code, which it then executes in series. More specifically, the queue 1008 can define a single thread of control that includes an arbitrary interleaving of page script code and extension code. This means that the browser may execute one or more blocks of page script code, followed by one or more blocks of extension code, followed by one or more blocks of page script code, and so on.

The extension code is statically verified in the manner described above, and can therefore be regarded as trusted. In contrast, the page script code is unverified (from the standpoint of static analysis module 116, which has no advance knowledge of the nature of the page script code). This interleaving of trusted and unverified code raises the following concern. Although the extension code has been deemed safe, there is a concern that it can interact with page script code in such a manner that it becomes unsafe.

The environment 100 adopts a model, however, which ensures the execution safety of the browser extension in the presence of unverified (and unanticipated) page script code. Namely, the environment 100 adopts a model in which a browser extension is dependent only on a monotonically increasing set of facts about the page metadata. As described above, this means that a fact in a set of facts will remain stable regardless of additional facts which are added to the set. In the context of FIG. 10, this means that the operations performed by the page script code will not interfere with any previous facts established by the extension code. That is, the page script code may add facts during its operation, but those facts will not interfere with prior facts established by the extension code. This property ensues in part from the use of Datalog to express the policies, which, as said, provides restricted use of negation.

The above conclusion has the following implication regarding the static analysis of the browser extensions. The static analysis module 116 can perform static analysis on the browser extension without consideration of any (later) intermingling of the extension code and unanticipated page script code during execution of the browser extension. That is, the facts maintained in the virtual log 206, and the conclusions derived therefrom, will not be subverted by the (later) presentation of unverified page script code.

Now advancing to a description of the static analysis itself, the process begins by producing a browser extension in Fine (or some other type-safe language) and linking the extension against libraries that implement extension-related APIs. The APIs are decorated with refinement types describing security-relevant pre-conditions and post-conditions. The approach then involves verifying the browser extension using a Fine refinement type checker or other suitable static analysis technique.

The manner in which the static analysis module 116 operates will be set forth below by way of an example. In connection with that example, FIG. 11 provides a refined API for interacting with the DOM. FIG. 12 describes a policy which grants privileges to an extension body. And FIG. 13 describes the extension body itself. The operation of the static analysis module 116 will be clarified in the context of the description of FIG. 13. As a whole, the browser extension in this example performs the basic operation outlined in FIG. 4, e.g., by extracting website information from one site and delivering it to another site.

Starting with FIG. 11, this figure shows a fragment of a refined DOM API that is accessible to the browser extension. In lines 2 and 3, the API defines two abstract types, "doe" and "elt," identifying the types of web documents and document nodes, respectively.

The API next defines a number of type constructors corresponding to the predicates of the policy language (of FIG. 8). More specifically, in lines 5-9, the API provides definitions of several metadata predicates that can be used to express the structure of a page. For example, at line 5, the API defines a "DocDomain" predicate that constructs a proposition from a "doc" and a string value. In lines 11-14, the API provides predicates corresponding to authorization privileges. The language used to express the API accommodates the use of polymorphic propositions. For example, the "FlowsFrom" proposition at line 8 relates a value v1 of any type to another value v2 of some other type, to indicate that v1 was derived from v2.

In lines 17-21, the API provides a sampling of functions that browser extensions can use to inspect the structure of a page. The API gives each of these functions a refined type, where the refinement on the return value corresponds to a post-condition established by the function. In lines 23-30, the API defines functions that provide browser extensions with access to security-sensitive data, e.g., the attributes of an element. The types of these functions are refined with both pre-conditions and post-conditions, where the pre-conditions correspond to authorization privileges that the caller is expected to possess in order to access, for example, an attribute. The post-conditions, as with the metadata queries, record properties of the page structure in the virtual log 206.

Generally, the nature of the functions listed in FIG. 11 is indicated by their descriptive labels. For example, the function "getAttr" gets an attribute from the page. The function "getValue" gets a value of an attribute. The function "getEltByld" provides random access to a node using a node identifier. Some of the functions allow browser extensions to mutate the DOM. For example, using "createElt" and "appendChild," a suitably privileged browser extension can alter the structure of a web page. The environment 100 models such mutation effects purely in terms of their effects on the virtual log 206. Since the virtual log 206 grows monotonically, a property that was once true of an element remains valid in the logic even after the element is mutated.

Now advancing to FIG. 12, this figure shows the policy of the browser extension. The policy includes five enumerated assumptions. In lines 1-3, the policy defines a relation "EltAncestor" with respect to "EltParent." These lines also define the transitive closure associated with this relationship. In lines 4 and 5, the policy grants the browser extension the privilege to: 1) read the "class" attribute of every element on the page; and 2) to read the contents of any sub-tree in the page rooted at a "div" node whose class attribute is "website." Hence, the policy shown in FIG. 12 is a more elaborately-stated version of the simplified policy 700 described above (in connection with FIG. 7).

Advancing to FIG. 13, this figure shows the extension body of the browser extension. At line 8, the extension body extracts a tag t of the element e. The post-condition of this function allows the static analysis module 116 to conclude, after line 8, that the proposition "EltTagName e p" is in the virtual log 206 (because the symbolic execution of this proposition causes this fact to be stored in the virtual log 206). In order to check the call at line 9, the extension body is asked to prove that the pre-condition "CanReadAttr e 'class'" is derivable. This result follows from the top-level assumptions of the policy.

After line 9, the static analysis module 116 can conclude that the fact "EltAttr e 'class'" is present in the virtual log 206. At line 11, in the then-branch of the conditional, the static analysis module 116 uses the types of the equality operation and the Boolean operator to refine its information about the contents of the virtual log 206. In particular, the static analysis module 116 concludes that, if control passes to line 11, then both "EltTagName e 'div'" and "EltAttrr e 'class' 'website'" are present in the virtual log 206. Using similar reasoning, the static analysis module 116 can conclude that, if control passes to line 12, "EltParent e c" is present in the virtual log 206.

Finally, at the call to "getValue c" at line 12, the static analysis module 216 seeks to show that the pre-condition "CanReadValue c" is derivable. The static analysis module 216 can establish this fact based on the top-level assumptions in the policy, together with all the accumulated information about the contents of the virtual log 206.

This subsection closes with another example of an API, policy, and extension body associated with another browser extension, as shown in FIG. 14. This browser extension provides a news personalization service that operates in conjunction with the hypothetical news-related site abc.com. The browser extension re-arranges the news stories presented on the front page of the site abc.com in an order that is deemed to more likely interest the user. To operate in this manner, the browser extension performs the following four steps.

1) When the user browses to abc.com, the browser extension reads a preference file on the user's local file system (e.g., provided by the user device). That preference file specifies a user's news-related preferences.

2) The browser extension then sends data from this preference file to a social news website, the hypothetical xyz.com. From that source, the browser extension obtains popularity information which identifies news stories that are currently assessed as popular and which match the interests of the user.

3) The browser extension then consults the user's browsing history to determine the popular news stores that appear on abc.com, but have not already been accessed (and presumably read) by the user.

4) Finally, the browser extension re-arranges the abc.com page, placing unread popular stories towards the top of the page or in other prominent positions.

For this browser extension, assume that the developer aims to create a policy which ensures that xyz.com only obtains data from the preference file. Further, the developer may attempt to ensure that no information about the browsing history is leaked to abc.com (beyond what it can already determine based on the selections made by the user within that site).

Referring now to FIG. 14, in lines 2-10, an API provides the browser extension with access to the local file system, URLs, network resources, and browsing history. Note that the API provides a mechanism, using the "historyOnSite" function, to selectively access parts of the user's browsing history, rather than the entire user's browsing history. Namely, the "historyOnSite" function performs this operation by permitting the browser extension to view the history of URLs that a user may have visited on a particular site, not all sites.

In lines 12-14, the policy grants the extension body the right to read the preference ("prefs") file and to read a user's browsing history only for abc.com. Line 15 particularly stipulates that only information derived from the "prefs" file can be sent to xyz.com. Lines 16-17 specify that the browser extension has the privilege to append an element e2 as the child of another element e1, but only if e1 is an abc.com node, and if e2 was derived from a node in the same domain. In other words, this assumption gives the browser extension the right to reorder the structure of nodes on an abc.com page, but not to add any new content.

In lines 20-25, the extension body includes code for reading data from the local preferences file and sending it to xyz.com. In line lines 27-36, the extension body includes code that rearranges articles on the abc.com site.

Static analysis on the policy and extension body shown in FIG. 11 proceeds in the same manner described above with respect to FIG. 13. Namely, the static analysis module 116 symbolically executes the extension body. At various junctures, the static analysis module 116 adds facts to the virtual log 206. When evaluating permissions, the static analysis module 116 can consult the policy, in conjunction with the facts in the virtual log 206.

A.4. Conversions Performed by the CAED

As stated in the introductory section, the CAED can receive and test an extension body in a language which accommodates static analysis, such as Fine. If the browser extension is deemed acceptable, the conversion module 122 can then convert the browser extension to one or more native forms that are compatible with one or more respective types of browsers. The browsers can then execute the converted browser extensions.

In a first example, assume that the browser corresponds to Internet Explorer® (IE) provided by Microsoft Corporation of Redmond, Wash. The conversion module 122 can compile the Fine-expressed browser extensions into .NET libraries. These libraries can then be loaded by a single native IE extension, or a BHO, in IE parlance. The BHO is implemented in F# and hosts the browser extensions in an unprivileged AppDomain, a software-isolated process for .NET. The AppDomain makes it easy to load and unload extensions while the browser is running.

In a second example, assume that the browser correspond to Chrome™, provided by Google Inc. of Mountain View, Calif. The conversion module 122 can compile the Fine-expressed browser extensions by translating .NET bytecode into JavaScript source code. In addition, the environment 100 can provide a JavaScript runtime system that exposes JavaScript's object-oriented DOM API as functions.

The conversion module 122 can perform other conversion operations associated with other browser types. For example the conversion module 122 can convert the Fine-expressed browser extensions into a form that is compatible with C3, an HTML5 experimentation platform written exclusively in C#.

In addition, the translation module 120 can accept legacy extensions from various sources. Consider, for example, legacy extensions which were originally authored for installment on the Chrome™ browser. Each of these extensions has three parts: a manifest, a content script, and an extension core. The manifest specifies the access privileges of the browser extension. The context script provides the browser extension's interface to the DOM, e.g., by allowing the browser extension to read and write to pages. The extension core provides the bulk of the other logic associated with the browser extension, and, in particular, can perform functions such as local storage, cross-domain requests, etc. The context script and the extension core communicate by message passing.

In one approach, the translation module 120 can translate both the content script and the extension core from their native JavaScript to Fine (or some other type-safe language that accommodates static checking) In another case, the translation module 120 just translates the content script to Fine, leaving the extension core in JavaScript. This latter solution does not provide the same assurances as the first solution, but it is simpler to implement.

B. Illustrative Processes

FIGS. 15-18 show procedures which explain one manner of operation of the environment 100 of FIG. 1. Since the principles underlying the operation of the environment 100 have already been described in Section A, certain operations will be addressed in summary fashion in this section.

Figure 15:
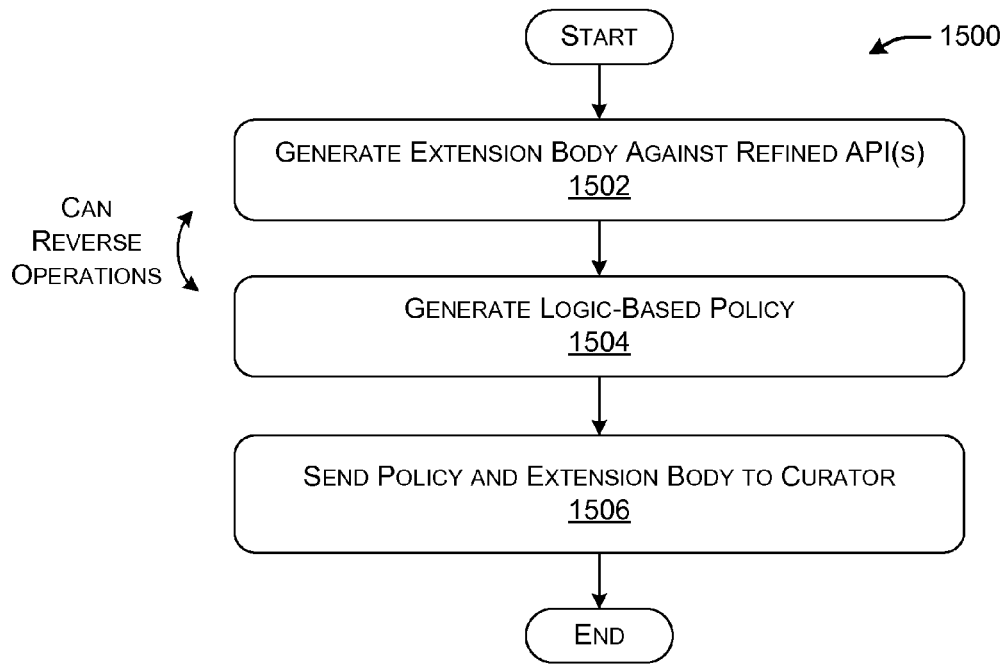
FIG. 15 is a flowchart that describes one manner of developing a browser extension and providing that browser extension to the curator system.

Starting with FIG. 15, this figure shows a procedure 1500 that describes one way to generate a browser extension. In block 1502, a developer can generate the extension body against one or more refined API(s). In block 1504, the developer can generate the logic-based policy. In other implementations, block 1504 can proceed block 1502, or blocks 1502 and 1504 can be performed as an integral action. In one case, the user manually creates the policy. In another case, the user automatically or semi-automatically generates the policy. In block 1506, the developer sends the policy and the extension body to the CAED system 112.

Figure 16:
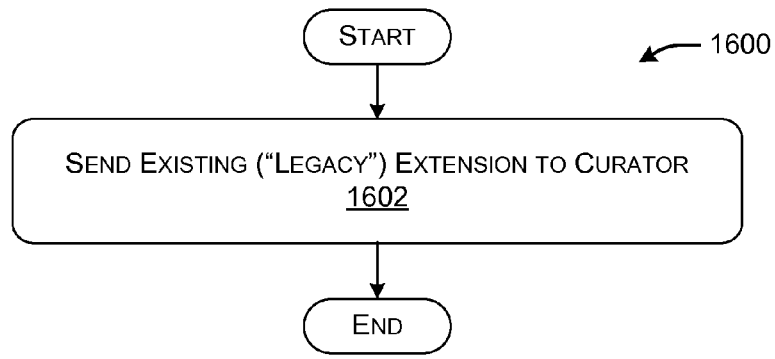
FIG. 16 is a flowchart that describes one manner of providing a legacy browser extension to the curator system of FIG. 1.

FIG. 16 shows a one-step procedure 1600. In this case, the developer or some other entity can forward a legacy extension, such as a Chrome Extension™, to the CAED system 112.

Figure 17:
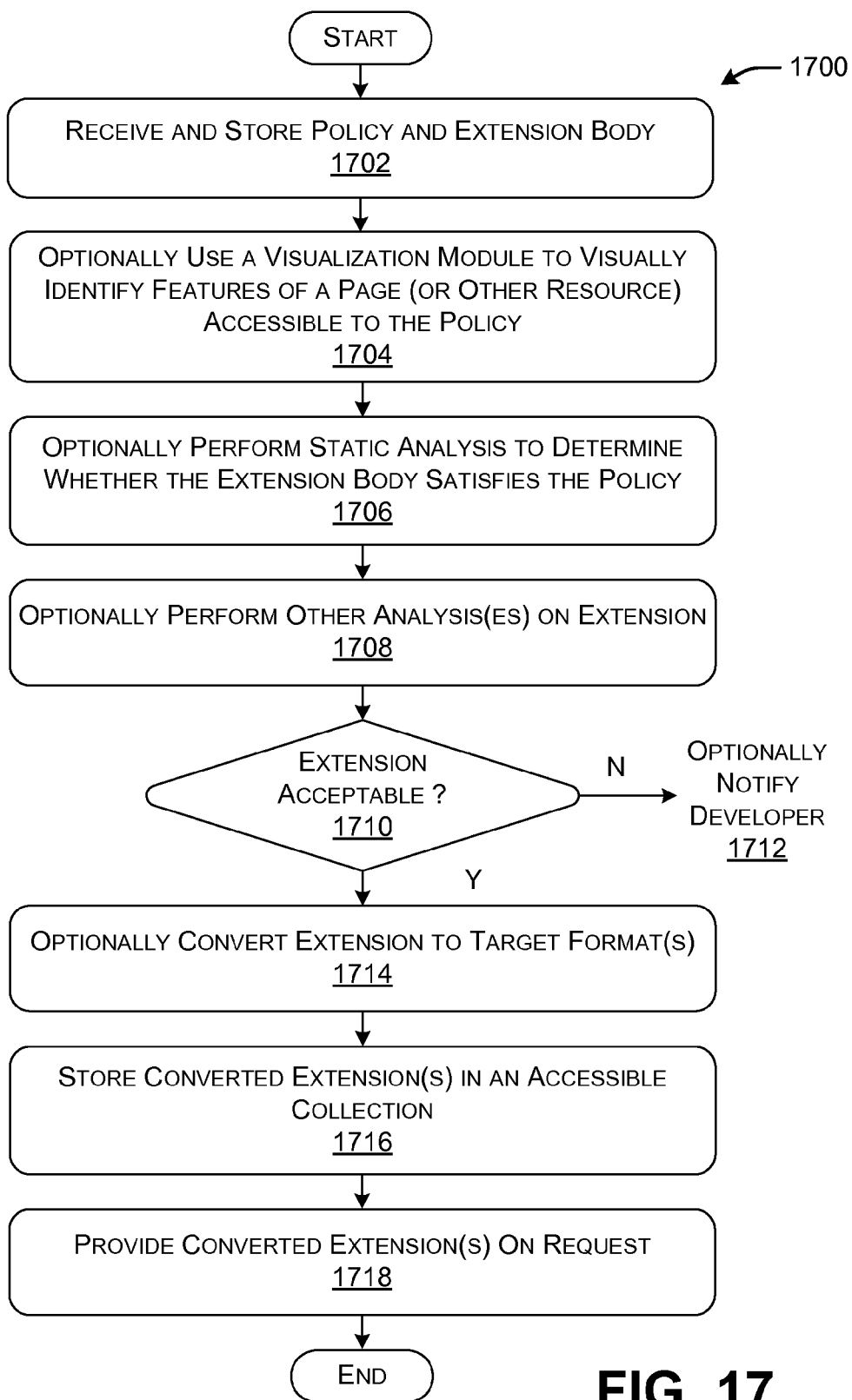
FIG. 17 is a flowchart that describes a procedure for analyzing and converting a browser extension at the curator system.

FIG. 17 shows a procedure 1700 by which the CAED system 112 can analyze and convert a browser extension. For this case, assume that the browser extension has a policy authored in Datalog or some other logic-based language and an extension body authored in Fine or some other appropriate language that accommodates static analysis. In block 1702, the CAED system 112 can receive and store the policy and extension body. In block 1704, the CAED system 112 can optionally use the visualization module 114 to highlights parts of a particular page (or pages) (and/or other resource(s)) that are accessible by the policy. In block 1706, the CAED system 112 uses the static analysis module 116 to determine whether the extension body satisfies the policy for any arbitrary interleaving of extension code and page script code. In block 1708, the CAED system 112 can perform any other types of analyses, such as the above-described pattern matching analysis.

In block 1710, the CAED system 112 determines whether the browser extension is acceptable, e.g., based on whether it satisfies the tests in blocks 1704-1706. If not, in block 1712, the CAED system 112 can optionally notify the developer of the problem. If the browser extension is acceptable, in block 1714, the CAED system 112 can use the conversion module 122 to convert the browser extension from Fine to a form or forms associated with one or more types of target browsers. In block 1716, the CAED system 112 stores the converted browser extensions produced in block 1714 in the data store 124. In block 1718, the CAED system 1112 delivers requested browser extensions to the users.

Figure 18:
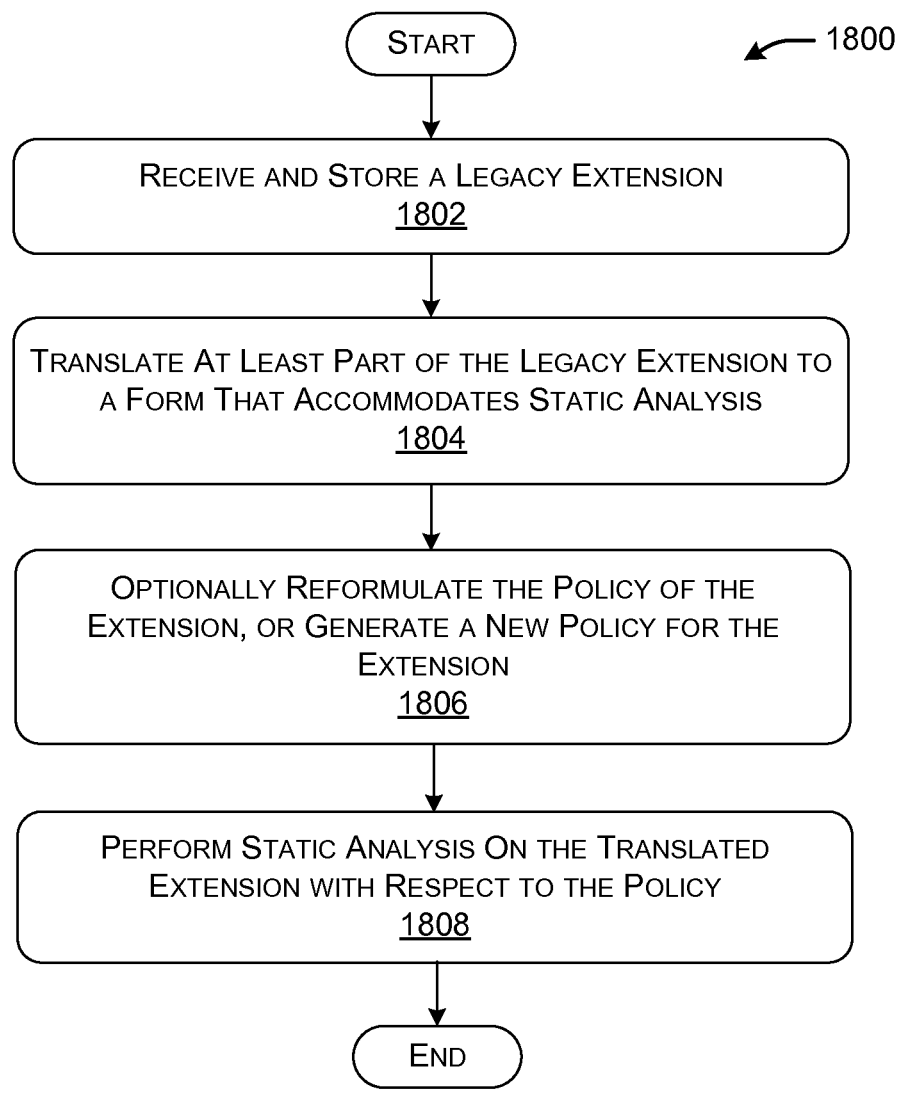
FIG. 18 shows one manner of processing a legacy browser extension at the curator system.

FIG. 18 shows a procedure 1800 whereby the CAED system 112 can receive and analyze a legacy extension. In block 1802, the CAED system 112 receives and stores the legacy extension. In block 1804, the CAED system 112 can translate at least part of the legacy extension to a form that accommodates static analysis, e.g., by translating the content script of a Chrome Extension™ from JavaScript to Fine. In block 1806, the CAED system 112 can optionally reformulate the policy (if it exists) of the legacy extension, e.g., to render it more precise and fine-grained. In block 1808, the CAED system 112 can perform static analysis (and any other type of analysis) on at least part of the legacy extension that has been translated.

C. Representative Processing Functionality

FIG. 19 sets forth illustrative electrical data processing functionality 1900 (also referred to herein a computing functionality) that can be used to implement any aspect of the functions described above. For example, the processing functionality 1900 can be used to implement any aspect of the environment 100 of FIG. 1, including any aspect of the development tool(s) 102 used by developers, any aspect of the functionality provided by the CAED system 112, and any aspect of the user devices that implement the browsers (such as user device 306). In one case, the processing functionality 1900 may correspond to any type of computing device that includes one or more processing devices. In all cases, the electrical data processing functionality 1900 represents one or more physical and tangible processing mechanisms.

The processing functionality 1900 can include volatile and non-volatile memory, such as RAM 1902 and ROM 1904, as well as one or more processing devices 1906 (e.g., one or more CPUs, and/or one or more GPUs, etc.). The processing functionality 1900 also optionally includes various media devices 1908, such as a hard disk module, an optical disk module, and so forth. The processing functionality 1900 can perform various operations identified above when the processing device(s) 1906 executes instructions that are maintained by memory (e.g., RAM 1902, ROM 1904, or elsewhere).

More generally, instructions and other information can be stored on any computer readable medium 1910, including, but not limited to, static memory storage devices, magnetic storage devices, optical storage devices, and so on. The term computer readable medium also encompasses plural storage devices. In all cases, the computer readable medium 1910 represents some form of physical and tangible entity.

The processing functionality 1900 also includes an input/output module 1912 for receiving various inputs (via input modules 1914), and for providing various outputs (via output modules). One particular output mechanism may include a presentation module 1916 and an associated graphical user interface (GUI) 1918. The processing functionality 1900 can also include one or more network interfaces 1920 for exchanging data with other devices via one or more communication conduits 1922. One or more communication buses 1924 communicatively couple the above-described components together.

The communication conduit(s) 1922 can be implemented in any manner, e.g., by a local area network, a wide area network (e.g., the Internet), etc., or any combination thereof. The communication conduit(s) 1922 can include any combination of hardwired links, wireless links, routers, gateway functionality, name servers, etc., governed by any protocol or combination of protocols.

In closing, the description may have described various concepts in the context of illustrative challenges or problems. This manner of explication does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by at least one processing device, the method comprising:
   receiving and storing a browser extension, the browser extension comprising a browser extension body and a browser extension policy that defines fine-grained privileges associated with the browser extension body, the fine-grained privileges specified by the browser extension policy including an access control privilege indicating that the browser extension is entitled to access a particular part of a web page;
   verifying that the browser extension body does not include browser extension code that violates the browser extension policy using a static analysis technique; and
   adding the verified browser extension to a set of verified browser extensions including other verified browser extensions,
   wherein the verified browser extension is executed by one or more browsers without performing runtime safety analysis to confirm that the browser extension body is authorized to access the particular part of the web page.

2. The method of claim 1, wherein the browser extension policy is expressed in a logic-based specification language.

3. The method of claim 2, wherein the browser extension policy is expressed in a language having constraints on use of negation.

4. The method of claim 1, wherein the browser extension policy expresses the fine-grained privileges using:
   a customizable collection of metadata predicates applicable to a structure and content of resources accessible to the browser extension, the resources including at least one of: browser-local storage; resource identifiers; and network messages; and
   a collection of permission predicates that grant respective permissions over the resources to the browser extension.

5. The method of claim 4, wherein the fine-grained privileges include
   a dataflow privilege which constrains an interaction between resources, including an ability of the browser extension to interact with a third-party entity.

6. The method of claim 1, further comprising manually authoring the policy.

7. The method of claim 1, further comprising, at least in part, automatically generating the browser extension policy based on an analysis of the browser extension body and resource structure targeted by the browser extension body.

8. The method of claim 1, wherein the browser extension body is formulated using a language that accommodates static type-checking.

9. The method of claim 1, wherein the browser extension body is formulated against at least one application programming interface (API), and wherein the API includes logical pre-conditions and post-conditions.

10. The method of claim 9, wherein the logical pre-conditions and post-conditions are stated using refinement types.

11. The method of claim 1, wherein said verifying involves modeling a runtime behavior of the browser extension using a monotonically-increasing set of facts about the browser extension body, wherein a monotonic nature of said modeling ensures that the browser extension body will continue to satisfy the policy for any interleaved execution of unverified page script code and the browser extension body.

12. The method of claim 1, further comprising rendering an impact of the browser extension policy on a resource that is accessible to the browser extension by visually identifying features of the resource that are impacted by the browser extension policy.

13. The method of claim 1, further comprising, prior to storage of the browser extension, converting the browser extension to a form that is compatible with any target browser type selected from a set of target browser types, to provide a converted browser extension.

14. The method of claim 1, further comprising:
receiving and storing a legacy browser extension that is not provided in a form that readily accommodates static analysis;
translating at least part of the legacy browser extension to a form that accommodates static analysis; and
performing safety-related analysis on the legacy browser extension that has been translated.

15. A curator system, implemented by physical and tangible computing functionality, for providing a collection of browser extensions for downloading by end users, comprising:
a static analysis module configured to perform static analysis on a browser extension, the browser extension comprising an extension body and a policy, the policy defining fine-grained privileges associated with the extension body using a logic-based language, the static analysis module operating to verify whether or not the extension body satisfies the policy;
a visualization module configured to render an impact of the policy on a resource that is accessible to the browser extension by visually identifying features of the resource that are impacted by the policy;
a conversion module configured to convert the browser extension to a form that is compatible with any target browser type selected from a set of target browser types, to provide a converted browser extension; and
a data store for adding the converted browser extension to the collection of browser extensions.

16. The curator system of claim 15, further comprising an interface module configured to supply browser extensions to browsers, the browser extensions being executable by the browsers without performing runtime safety analysis.

17. A physical and tangible computer readable storage device storing computer readable instructions, the computer readable instructions providing a browser extension that is executable by a browser, the computer readable instructions comprising:
a browser extension body that is part of the browser extension; and
a browser extension policy that is part of the browser extension, expressed in a logic-based specification language, and defines fine-grained privileges associated with the browser extension body, the fine-grained privileges defined by the browser extension policy including a dataflow privilege indicating that the browser extension is entitled to transfer information from a web page to a web site,
the browser extension policy expressing the fine-grained privileges using:
a collection of metadata predicates applicable to a structure and content of resources accessible to the browser extension; and
a collection of permission predicates that grant respective permissions over the resources to the browser extension.

18. The physical and tangible computer readable storage device of claim 17, wherein the computer readable instructions, when executed by one or more processing devices, cause the one or more processing devices to perform acts comprising:
executing the browser extension with the browser.

19. The physical and tangible computer readable storage device of claim 18, wherein the browser executes the browser extension without runtime checking to confirm that the browser extension is entitled to transfer the information from the web page to the web site.

20. The physical and tangible computer readable storage device of claim 17, wherein the computer readable instructions, when executed by one or more processing devices, cause the one or more processing devices to perform acts comprising:
determining that the browser extension body transfers the information from the web page to the web site; and
responsive to the determining, constructing the browser extension policy such that the browser extension policy indicates that the browser extension is entitled to transfer the information from the web page to the web site.

* * * * *